United States Patent [19]
Vishwakarma et al.

[11] Patent Number: 5,756,740
[45] Date of Patent: May 26, 1998

[54] PROCESS FOR THE PREPARATION OF BINARY SENSITIZING DYES

[75] Inventors: Lal Chand Vishwakarma, Rochester; Chin Hsin Chen, Mendon, both of N.Y.

[73] Assignee: Eastman Kodak Company, Rochester, N.Y.

[21] Appl. No.: 865,165

[22] Filed: Apr. 8, 1992

[51] Int. Cl.$^6$ .................. C07D 401/00; C07D 403/00; C07D 417/00; C07D 235/04; C07D 235/20; C07D 209/148

[52] U.S. Cl. .................. 544/300; 544/301; 544/302; 548/159; 548/305.4; 548/305.7; 548/461; 549/284

[58] Field of Search .................. 548/159, 327, 548/328, 461, 305.4, 305.7; 549/300, 301, 302, 284

[56] References Cited

U.S. PATENT DOCUMENTS

| | | | |
|---|---|---|---|
| 3,622,316 | 11/1971 | Bird et al. | 96/104 |
| 3,622,317 | 11/1971 | Bird et al. | 96/1.4 |
| 3,976,493 | 8/1976 | Borror et al. | 96/128 |
| 4,040,825 | 8/1977 | Steiger et al. | 96/1.7 |
| 4,146,396 | 3/1979 | Yokota et al. | 548/159 X |

FOREIGN PATENT DOCUMENTS

| | | | |
|---|---|---|---|
| 64-91134 | 4/1989 | Japan | 430/26 |

OTHER PUBLICATIONS

Mukaiyama, et al., Chemistry Letters, pp. 1045–1048 (1975); pp. 13–14 (1976).

Bald, et al., Chemistry Letters, pp. 1163–1166 (1975); Heterocycles, vol. 4, No. 10, pp. 1707–1710 (1976).

Huang, et al., Chemistry Letters, pp. 1465–1466 (1984).

Steglich, et al., Angew. Chem. Int. Ed. English, vol. 8 No. 12, p. 981 (1969).

Scriven, Chem. Soc. Rev., vol. 12, No. 2, pp. 129–161 (1983).

Fieser et al I, "Reagents for Organic Synthesis", vol. 3, pp. 118 to 119 (1972).

Fieser et al II, "Reagents for Organic Synthesis", vol. 9, pp. 156 to 157 (1981).

*Primary Examiner*—Floyd D. Higel
*Attorney, Agent, or Firm*—Gordon M. Stewart; Edith A. Rice

[57] ABSTRACT

A process for the preparation of photographic binary sensitizing dyes, which comprise two separate, nonconjugated chromophores, one of which has the capability of adsorbing to a silver halide grain surface, the other of which is substantially non-adsorbing to silver halide. The process comprises reacting two dye compounds in a solvent in the presence of a 2-halo-1-alkylpyridinium salt and a 4-dialkylaminopyridine.

14 Claims, No Drawings

PROCESS FOR THE PREPARATION OF BINARY SENSITIZING DYES

FIELD OF THE INVENTION

The present invention relates to a novel chemical synthesis process and, more particularly, to a process for the preparation of binary sensitizing dyes for photographic silver halide compositions.

BACKGROUND OF THE INVENTION

Techniques for spectrally sensitizing silver halide with dyes are well known in the art. Methine dyes such as merocyanine, cyanine, carbocyanine, and dicarbocyanine dyes can be used. Also, combinations of two or more dyes can be used to expand the range of absorption and to achieve supersensitization. These sensitizing dyes can be adsorbed on the silver halide surface and can inject electrons into the silver halide particles. If the silver halide surface is nearly or totally covered by dye, desensitization can result (W. C. Levis et al., *Photographic Science and Engineering*, 13, 54, 1969). Development of a silver halide particle so coated by dye may also be inhibited. The result is inefficient utilization of the exposure of a spectrally sensitized silver halide grain.

As a way of overcoming these problems, Bird et al., U.S. Pat. No. 3,622,316, propose a method in which dyes of different energy absorption frequencies are adsorbed on silver halide in separate layers. In U.S. Pat. No. 3,622,317 they disclose a method of preparing rigid pseudopolymeric compounds containing cyanine chromophores to produce energy conductive circuits on a silver halide surface.

Borror et al., U.S. Pat. No. 3,976,493, describe sensitizing dye compounds which contain two chromophores linked by an alkylene-amide moiety. These compounds are prepared by condensing one dye with the quaternary salt of a second dye, following which the new quaternary salt is condensed with an ICI intermediate in a conventional dye forming reaction. This procedure affords satisfactory yields of binary dyes, but it can generate impurities that cause desensitization even when present in very small concentration.

A "dual sensitizer," or "binary sensitizing dye," is a compound which comprises two separate, nonconjugated, covalently linked chromophores. Such binary sensitizing dyes absorb more light than conventional sensitizers and thus produce higher spectrally sensitized photographic speeds. One of these chroinophores (A) adsorbs well to the silver halide grain surface and has the proper redox potential to effect spectral sensitization. The other chromophore (B) is capable of transferring electronic energy to chromophore A but is non-adsorbing to the silver halide grains. In this situation a photon directly absorbed by chromophore A can transfer electrons to the grain, leading to spectral sensitization as encountered in conventional systems. Chromophore B does not displace A from the surface; therefore the efficiency of sensitization via directly excited A is not expected to diminish as a result of its attachment to B. Transfer of energy to chromophore A from chromophore B, whose emission band at least partially overlaps the absorption band of A, produces an increase in photographic speed. The sequence of the steps involved in this "additional sensitization" is as follows:

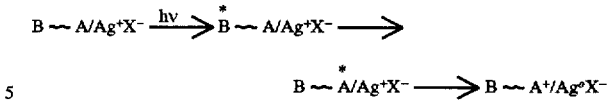

T. Ugai, M. Okazaki and T. Sugimoto, Kokai Patent No. SHO 64 [1989]-91134, propose connecting at least one virtually non-adsorbing dye containing at least two sulfo and/or carboxyl groups to a spectral sensitizing dye which can be adsorbed on silver halide. It is suggested that the required compounds can be prepared by dehydrating and condensing the carboxy substituent of one dye and the hydroxy group of another dye to form an ester bond, or by dehydrating and condensing the carboxy group and amino group of two different dyes to form an amide bond; however no specific procedures are described.

A procedure of Mukaiyama (T. Mukaiyama et al., *Chemistry Letters*, 1045 (1975); 1163 (1975); 13 (1976); 1465 (1984); and *Heterocycles*, 4 (10), 1707 (1976)), utilizes 2-chloro-1-methylpyridinium iodide as an agent to condense a carboxylic acid with an alcohol or an amine, leading to an ester or an amide, respectively. Mukaiyama's procedure is illustrated in the following equation:

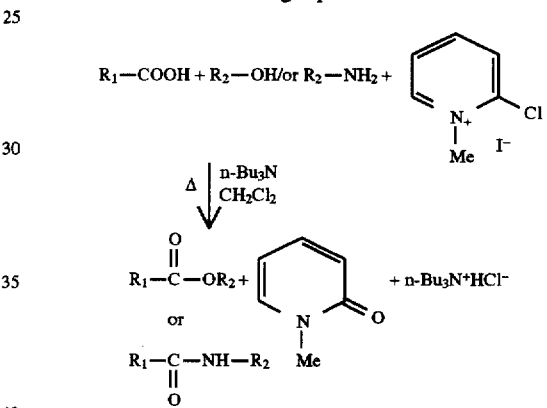

where $R_1$ and $R_2$ are alkyl, aryl, aralkyl or cycloalkyl groups. Dichloromethane is the recommended solvent for this procedure.

Repeated attempts to use the Mukaiyama procedure to condense a carboxyalkylsubstituted cyanine dye such as (IV) with a hydroxyalkylsubstituted merocyanine dye such as (V) have resulted either in complete failure or in a very low yield, less than 5%, of the dye (VI).

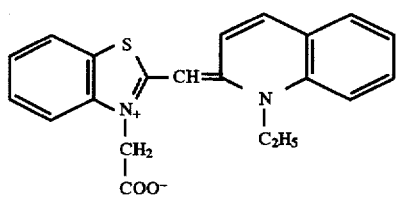

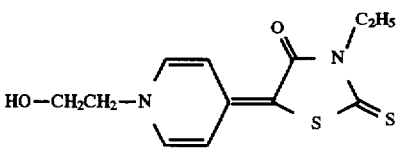

-continued

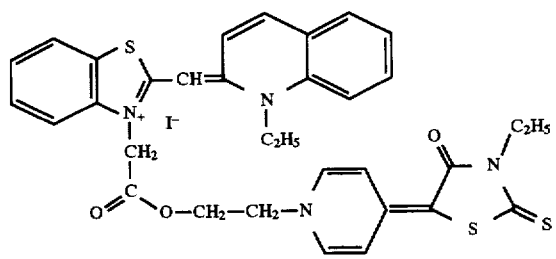
VI

The catalytic activity of 4-dialkylainopyridines, in particular 4-(diniethylamino)pyridine (DMAP), has been reported by W. Steglich and G. Hoefle, *Angew. Chem. Int Ed. Engl.*, 8, 981 (1969) and by E. Scriven, *Chem. Soc. Rev.*, 12 (2), 129–161 (1983). However, no suggestion is given of the use of such compounds as catalysts for the synthesis of binary dyes as in the process of the present invention.

BRIEF SUMMARY OF THE INVENTION

In accordance with the present invention it has been found that the failure of the Mukaiyama procedure with sensitizing dye compounds can be overcome by including a particular type of compound in the reaction mixture as a nucleophilic catalyst. The process of the invention comprises reacting two dye compounds which contain substituents that enable them to undergo a dehydrative condensation reaction in a solvent in the presence of a 2-halo-1-alkylpyridinium salt and a 4-dialkylaminopyridine as a catalyst. In the practice of the invention, dye compounds such as cyanine, carbocyanine, dicarbocyanine, tricarbocyaninie, merocyanine, rhodanine, carbonylbiscoumarin, and sulfonylbiscoumarin dyes can be used. One of the dye compounds that is reacted in the process of the invention contains a carboxyl group; the other contains an amino group or a hydroxyalkyl group.

DETAILED DESCRIPTION OF THE INVENTION

The present invention is a process for the preparation of binary sensitizing dyes comprising reacting two dyes which contain substituents that enable them to undergo a dehydrative condensation reaction in a solvent in the presence of a 2-halo-1-alkylpyridinium salt, preferably in at least an equimolar amount, and, as a catalyst, a 4-dialkylaminopyridine such as 4-(dinethylamino)pyridine (DMAP).

The species

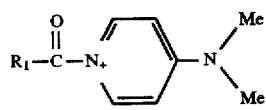

is postulated as a reactive intermediate which triggers the reaction with an alcohol or an amine to afford the respective ester or amide.

The process of the invention produces binary sensitizing dyes of general formulas (I), (II), or (III)

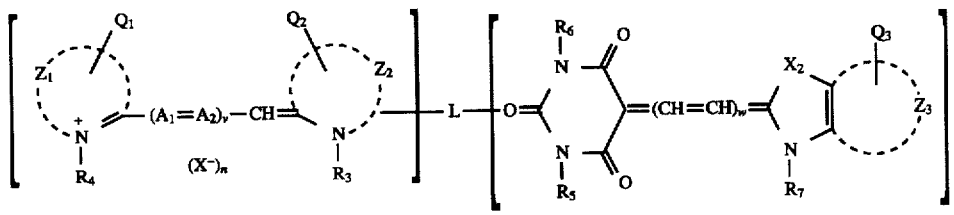
I

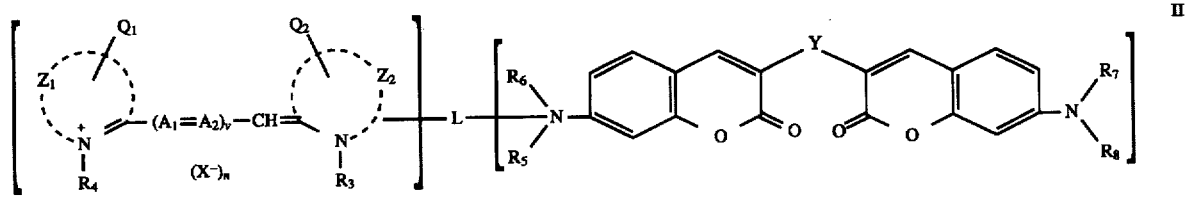
II

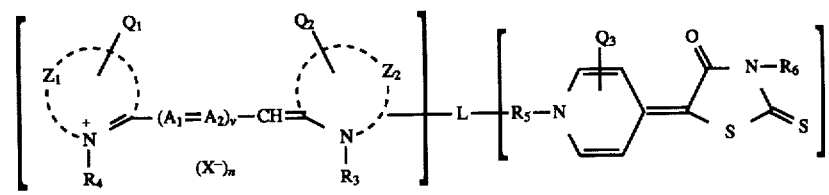
III wherein $A_1$ and $A_2$ each individually represent unsubstituted or alkylsubstituted methine groups; L represents a linking group of 4 to about 20 atoms containing at least two alkylene groups and at least one carbonyloxy or carbonylamino group; $Z_1$, $Z_2$, and $Z_3$ each represent the non-metallic atoms necessary to complete a substituted or unsubstituted heterocyclic ring system containing at least one 5- or 6- membered heterocyclic nucleus; $R_3$ and $R_4$ each individually represents an alkyl group of 1 to about 10 carbon atoms, or an aryl, aralkyl, or cycloalkyl group of 5 to about 12 carbon atoms, or, joined with $R_5$, $R_6$, $R_7$, $R_8$, or $Q_3$, represents L; $R_5$, $R_6$, $R_7$, and $R_8$ each individually represents an alkyl group of 1 to about 10 carbon atoms, or an aryl, aralkyl, or cycloalkyl group of 5 to about 12 carbon atoms, or, joined with $R_3$, $R_4$, $Q_1$, or $Q_2$, represents L; $Q_1$ and $Q_2$ each individually represents hydrogen, or an alkyl group of 1 to about 10 carbon atoms, or an aryl, aralkyl, or cycloalkyl group of 5 to about 12 carbon atoms, or, joined with $R_5$, $R_6$, $R_7$, $R_8$, or $Q_3$, represents L; $Q_3$ represents hydrogen, or an alkyl group of 1 to about 10 carbon atoms, or an aryl, aralkyl, or cycloalkyl group of 5 to about 12 carbon atoms, or, joined with $R_3$, $R_4$, $Q_1$, or $Q_2$, represents L; Y represents a carbonyl group, a sulfonyl group or a substituted nitrogen atom; X⁻represents an anion and n represents an integer of 1 or more, provided that when the formula forms a zwitterionic dye, n is 0; $X_2$ represents a carbon atom or a hetero atom N, O, S, Se or Te; and v and w individually represent integer numbers from 0 to 3.

According to general formulas (1), (II), and (III), $R_3$, $R_4$, $R_5$, $R_6$, $R_7$, $R_8$, $Q_1$, $Q_2$, and $Q_3$ can each individually be alkyl, cycloalkyl, aryl, or aralkyl groups, which can be substituted or unsubstituted. Examples of unsubstituted alkyl groups, are methyl, ethyl, propyl, isopropyl, butyl, isobutyl, pentyl, hexyl, octyl, and the like. Cycloalkyl groups can be cyclopentyl, cyclohexyl, 4-inethylcyclohexyl, and the like. For substituted alkyl and cycloalkyl groups, substituents can be, for example, halogen, alkoxy, sulfo, and the like. Aryl groups can be phenyl, naphthyl, and the like. Aralkyl groups can be benzyl, phenethyl, and the like. For substituted aryl and aralkyl groups, substituents can be halogen, alkyl, alkoxy, sulfo, and the like.

When the dye condensation reactions are carried out in methylene chloride, a significant amount of by-product of type (VII), which arises out of interaction of 2-chloro-1-methylpyridinium iodide with either a hydroxyl group or an amino group, is formed. In the method of the present invention it has been further found that the use of a polar aprotic solvent, preferably dimethylsulfoxide (DMSO), in place of methylene chloride as solvent yields a binary dye compound of general formula (I), (II) or (III), totally free of side product of type (VII).

The process of the invention is desirably effected with stirring at room temperature (25° to 30° C.). The reaction is usually complete within 30 minutes, although in the specific examples described herein reaction times of 2–3 hours have been used. An inert atmosphere of nitrogen or argon gas is not necessary, but in the examples the reactions were customarily carried out in an argon atmosphere. Reactions were worked up by pouring the homogeneous mixtures into approximately five volumes of acetone or other suitable solvent. The precipitated binary dyes were isolated and purified by well known techniques such as crystallization or chromatographic separation.

Thus the use of DMAP as a catalyst and DMSO as a solvent for the preparation of binary dyes according to the process of the invention is an unexpected and valuable discovery. Using these reaction conditions, the binary dye VI is obtained in 80–85% yield. In case of binary dyes containing an amide linking group, it is advantageous to use at least an equimolar amount of 3,4-dihydro-2H-pyrido[1,2a]pyrimidin-2-one (VIII) as a non-basic hydrogen halide acceptor.

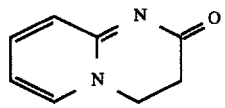

VIII

All the binary dyes of the general formula (I), (II) and (III) were obtained in 35–95% yield, depending on the purity of starting mono dyes.

Specific examples of the binary dye compounds in addition to (VI) that can be produced by the method of the present invention are shown below.

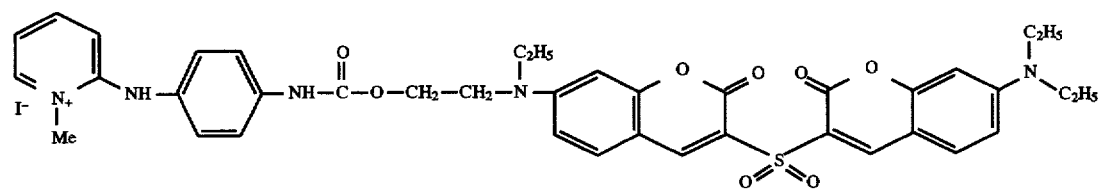

VII

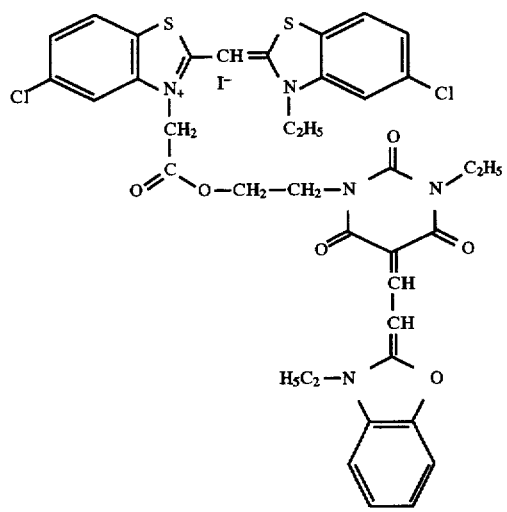
(1)
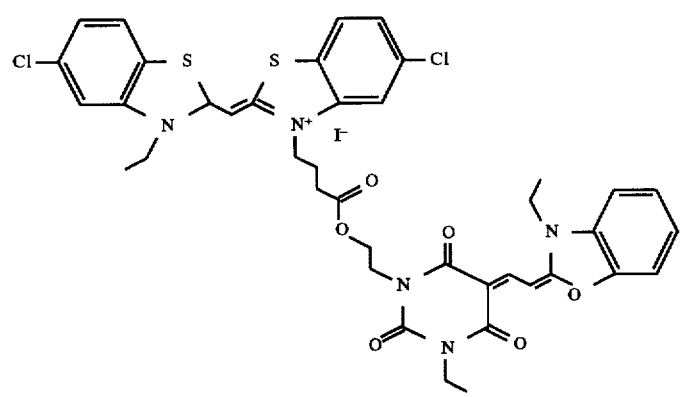
(2)
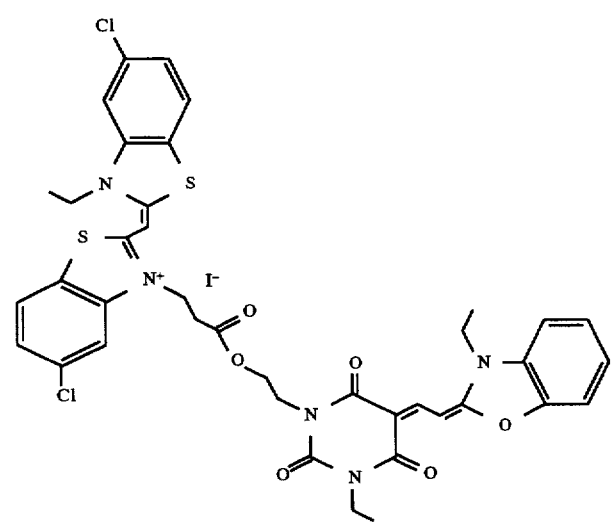
(3)

-continued
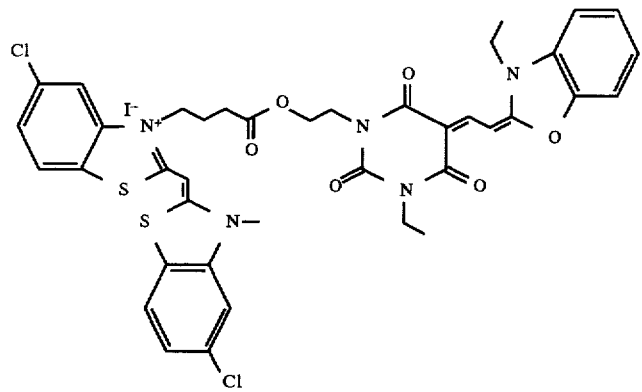 (4)
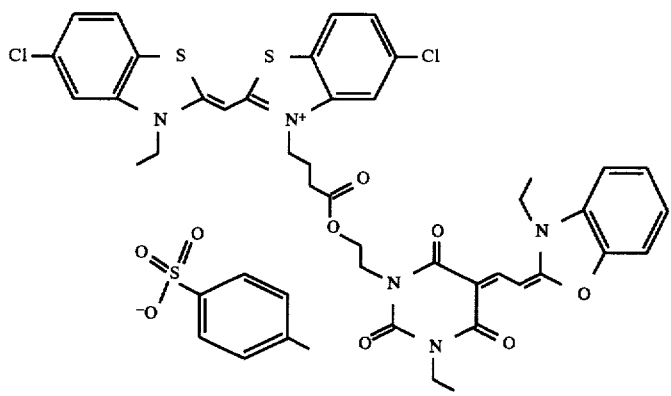 (5)
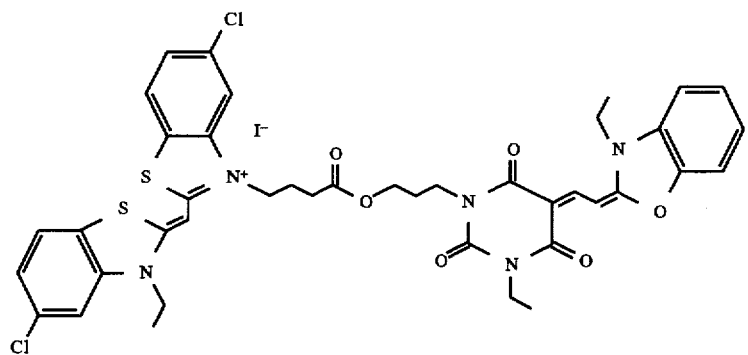 (6)
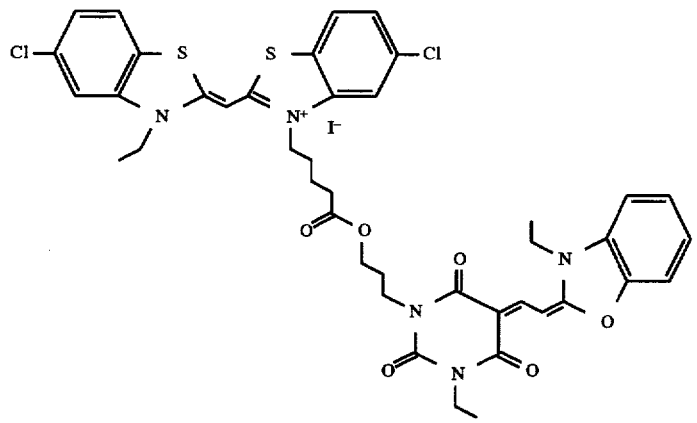 (7)

-continued
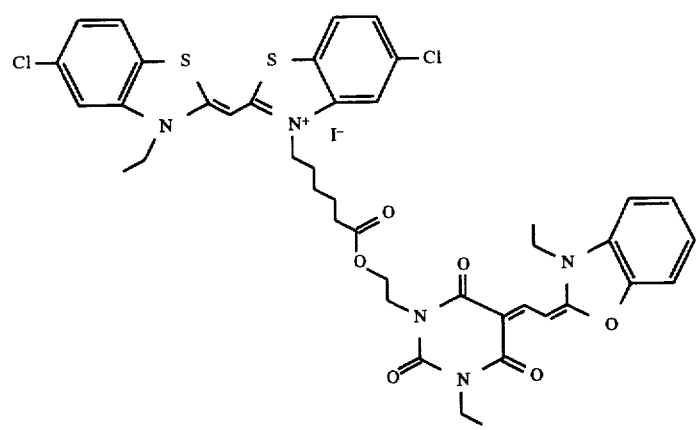
(8)
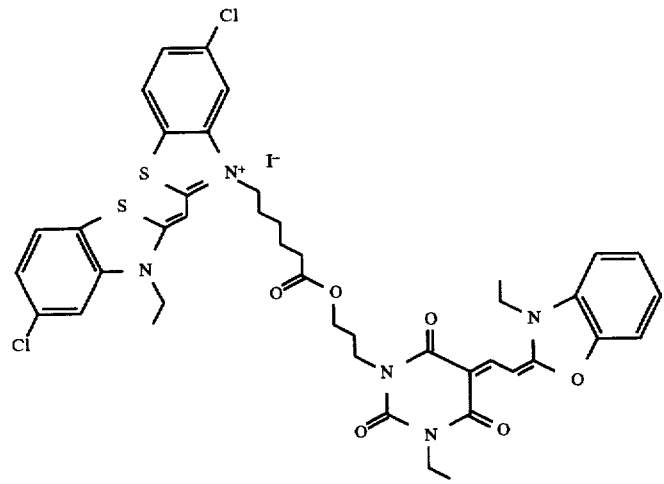
(9)
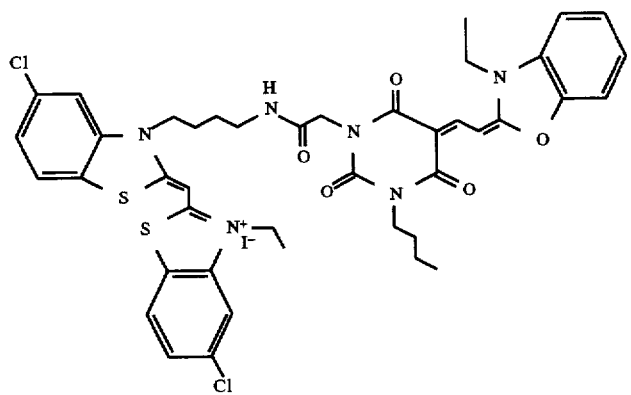
(10)

-continued
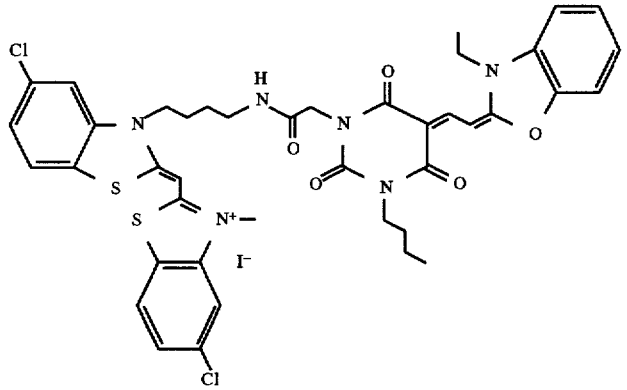
(11)
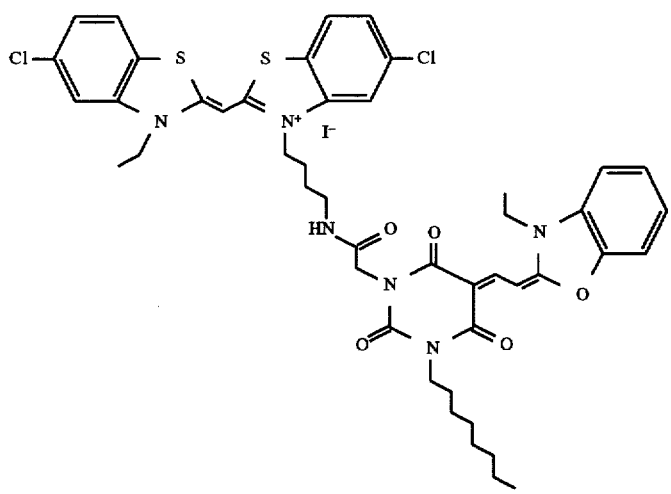
(12)
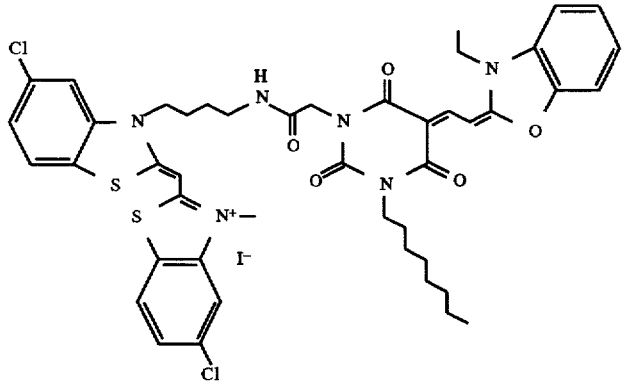
(13)
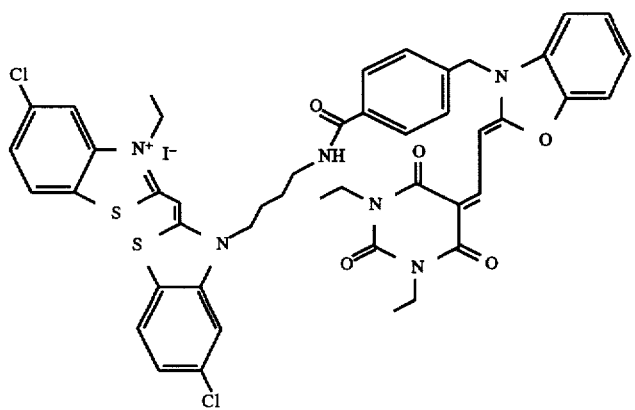
(14)

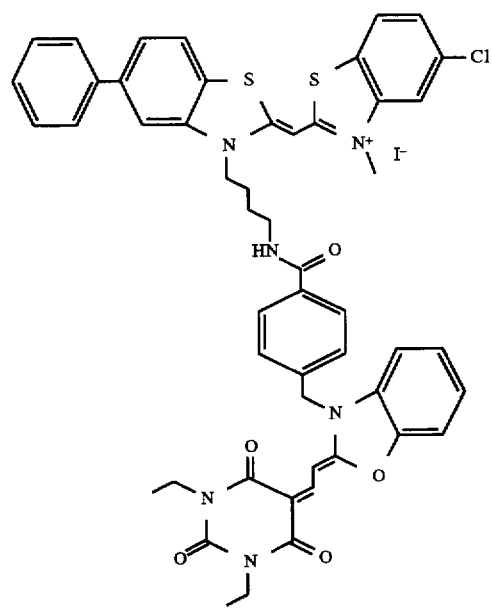
(15)
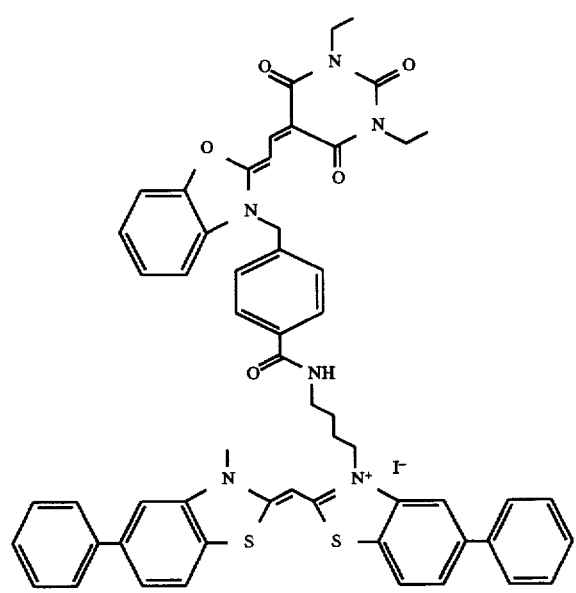
(16)

-continued
(17)
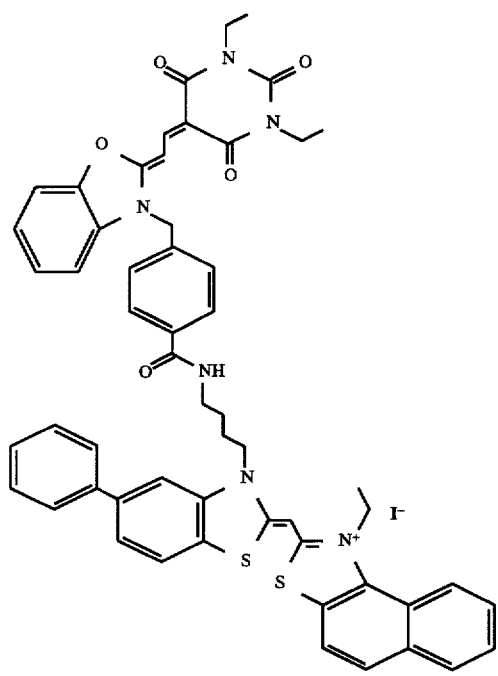
(18)
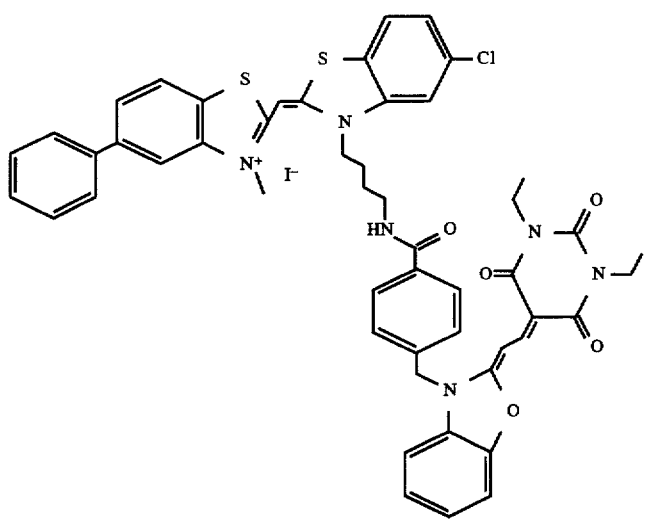

(19)
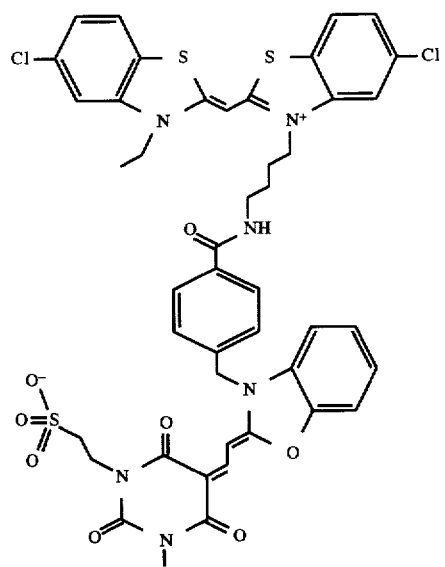
(20)
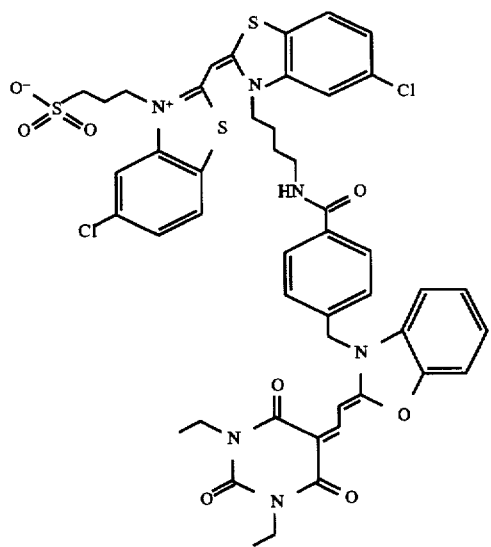
(21)
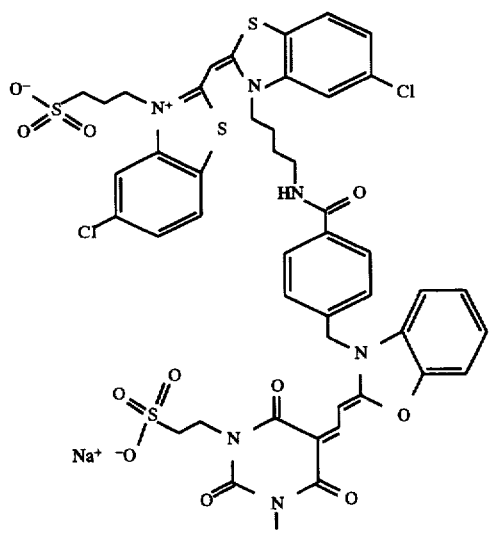

-continued
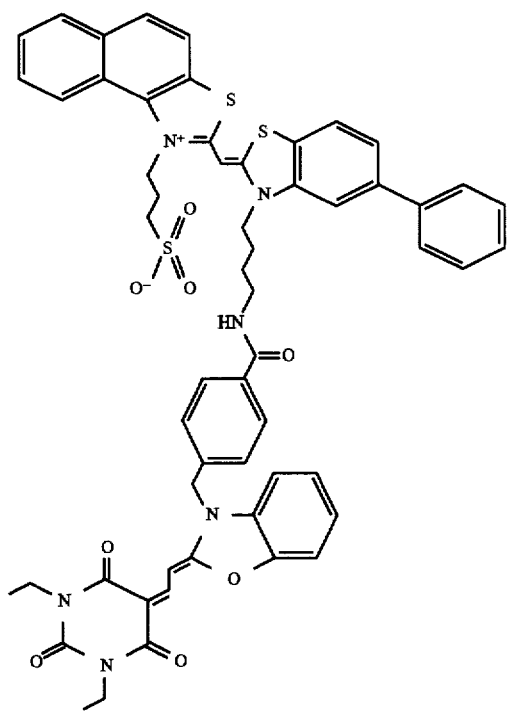
(22)
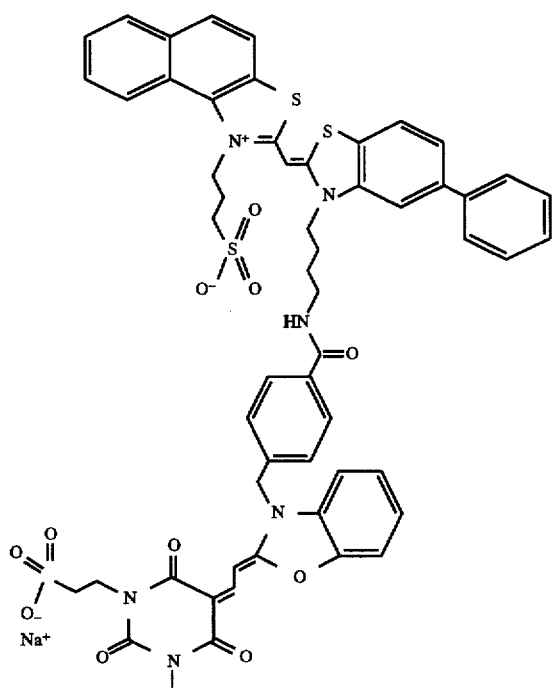
(23)

(24)
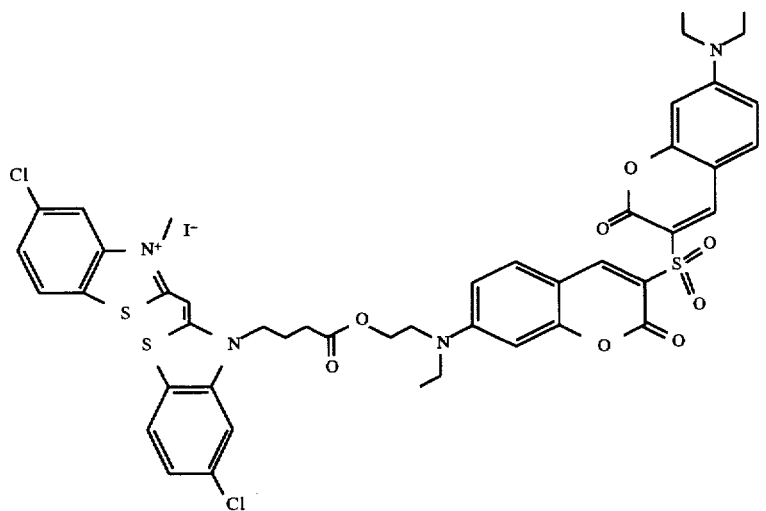
(25)
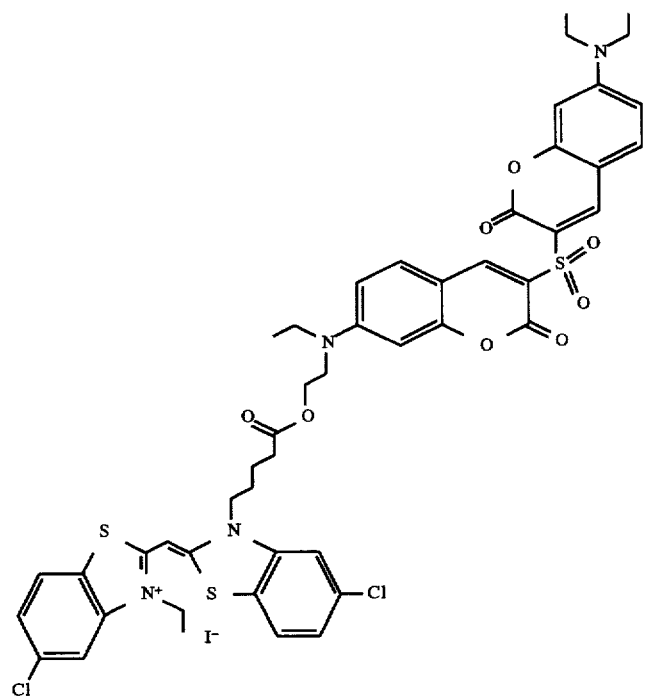

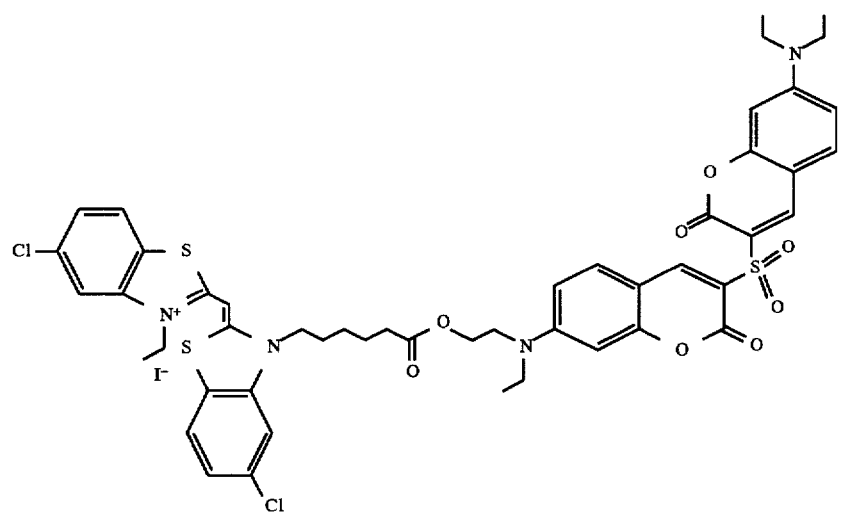
(26)
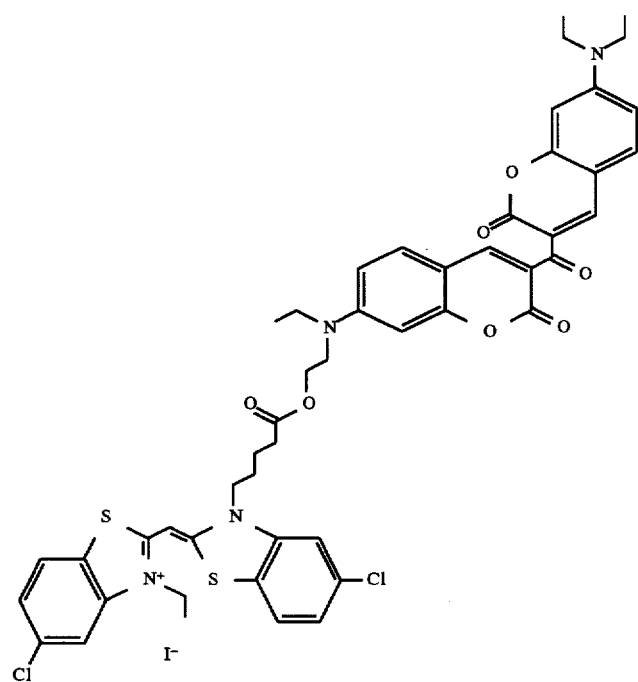
(27)

-continued
(28)
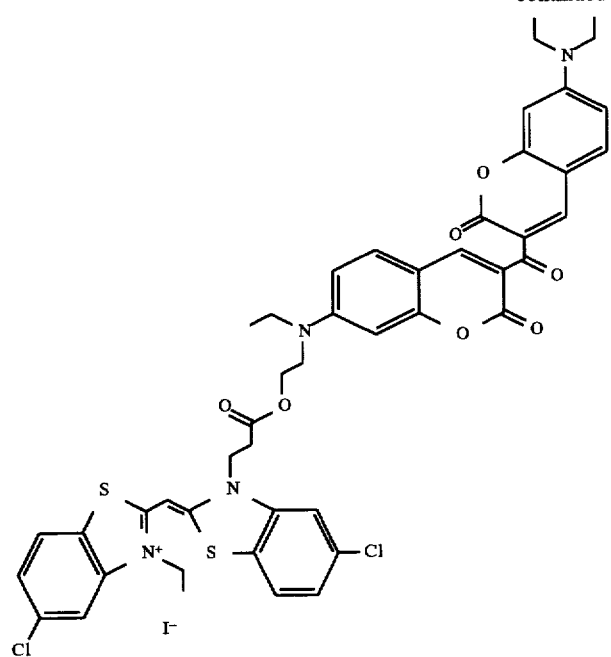
(29)
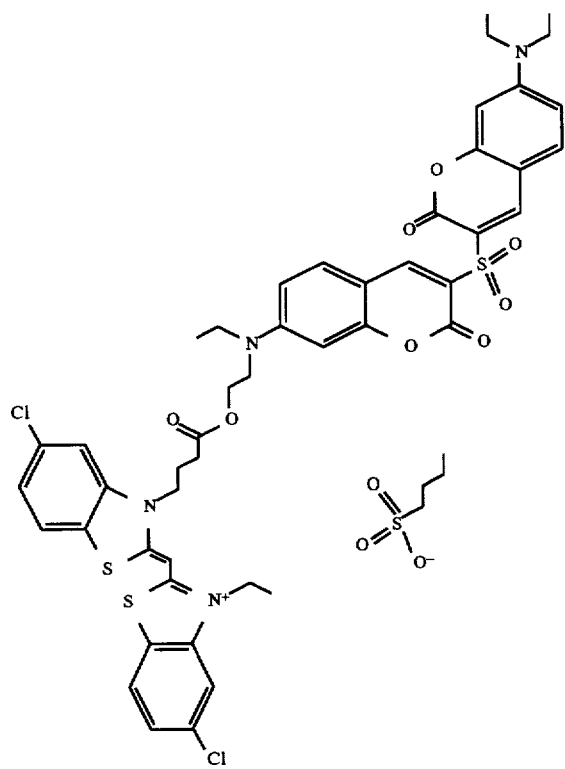

-continued
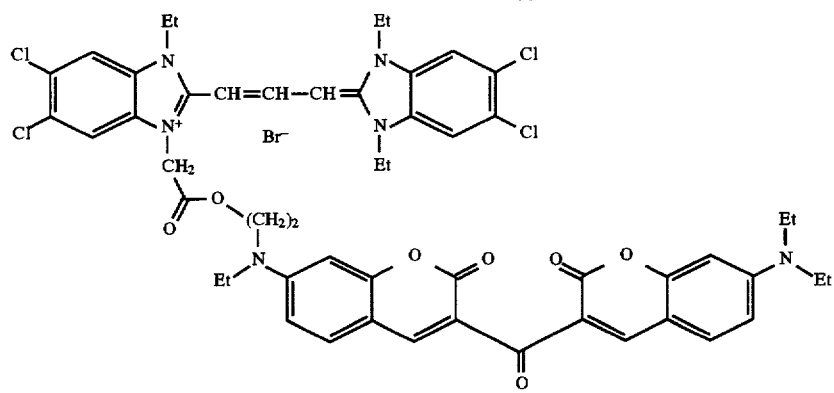
(30)
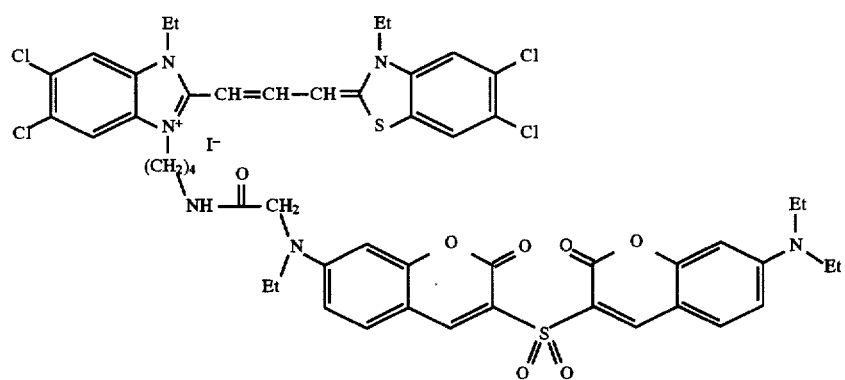
(31)
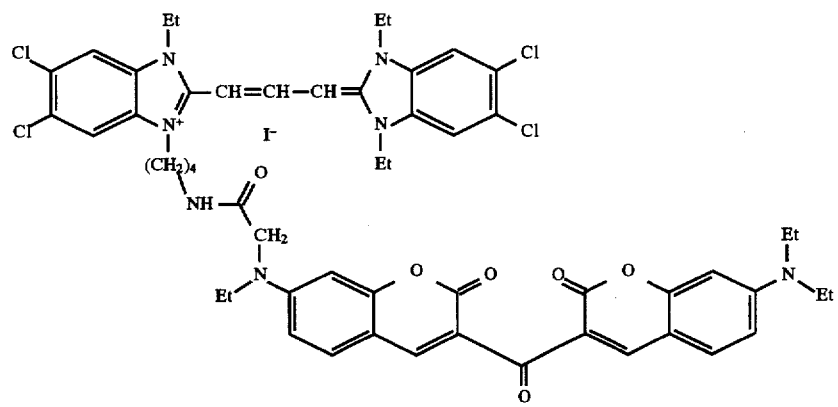
(32)
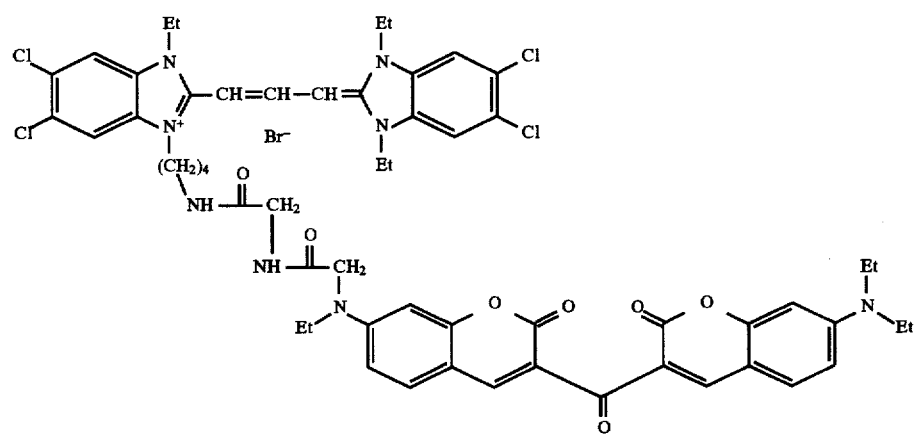
(33)

-continued
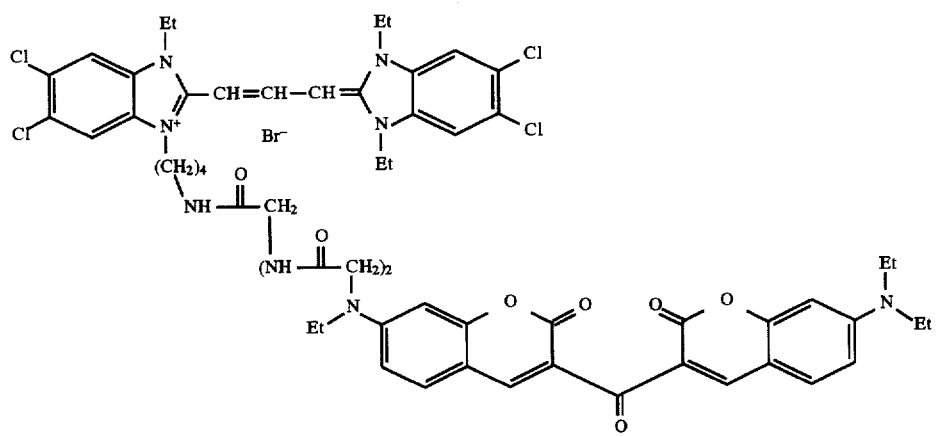
(34)
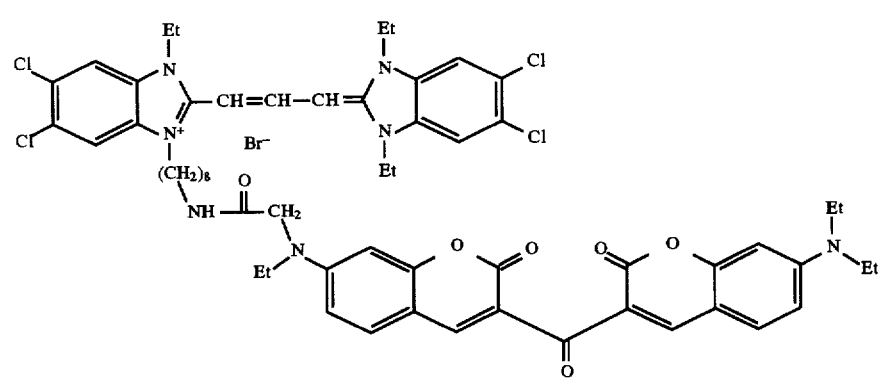
(35)
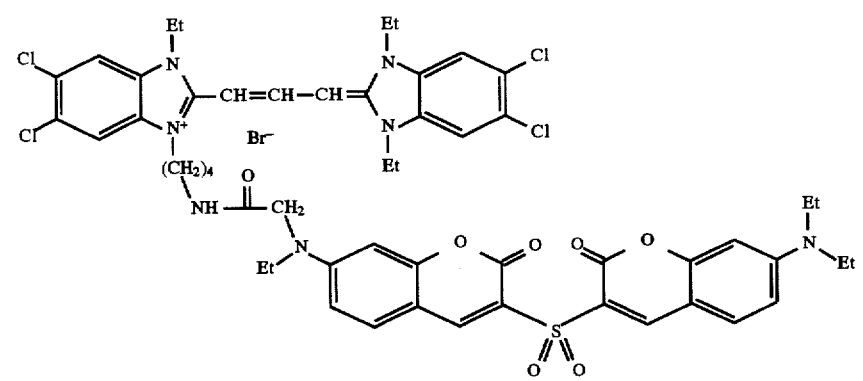
(36)

-continued
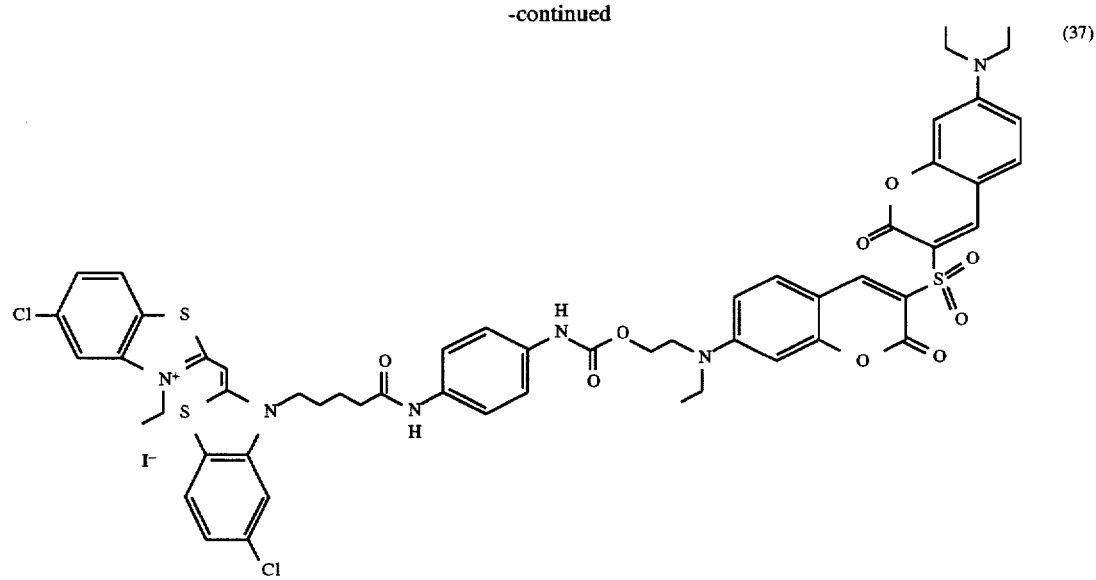
(37)
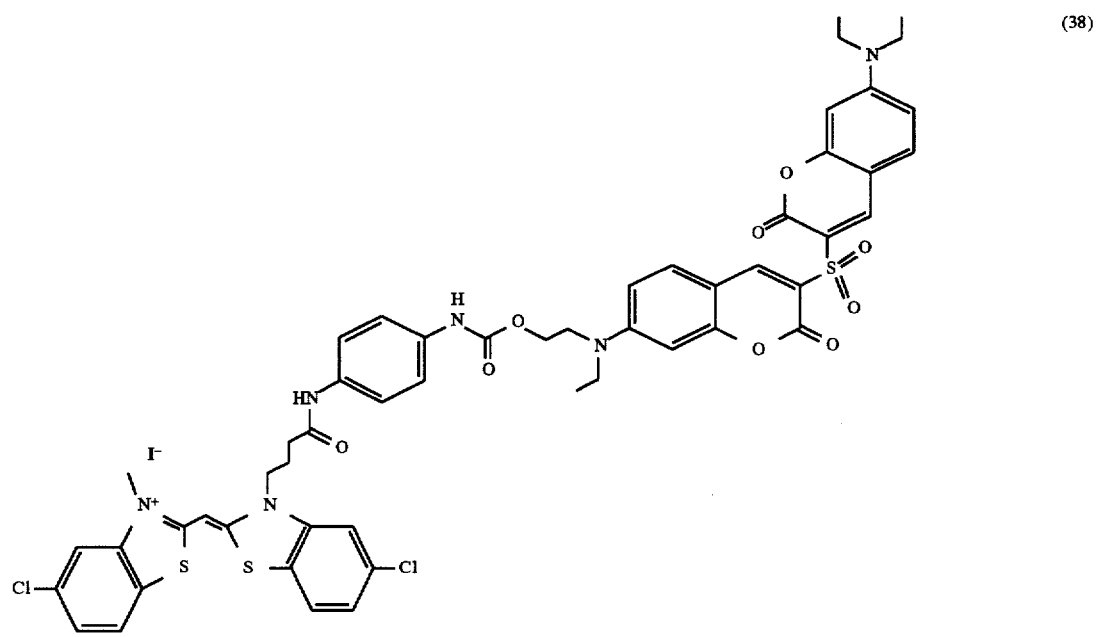
(38)
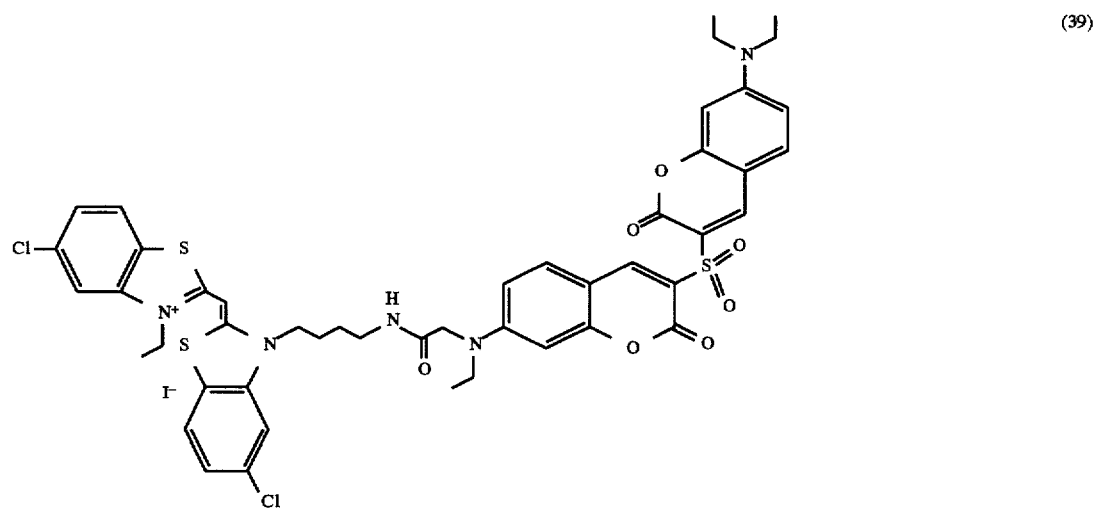
(39)

(40)
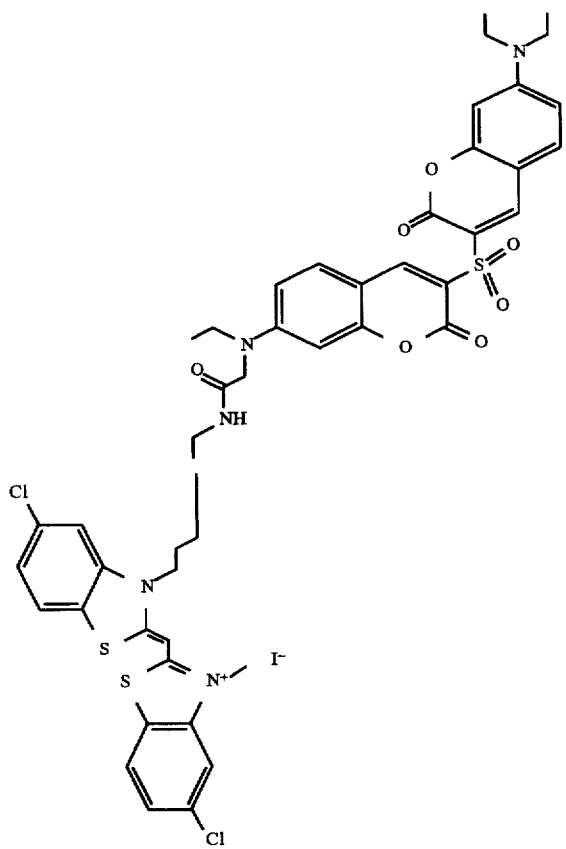
(41)
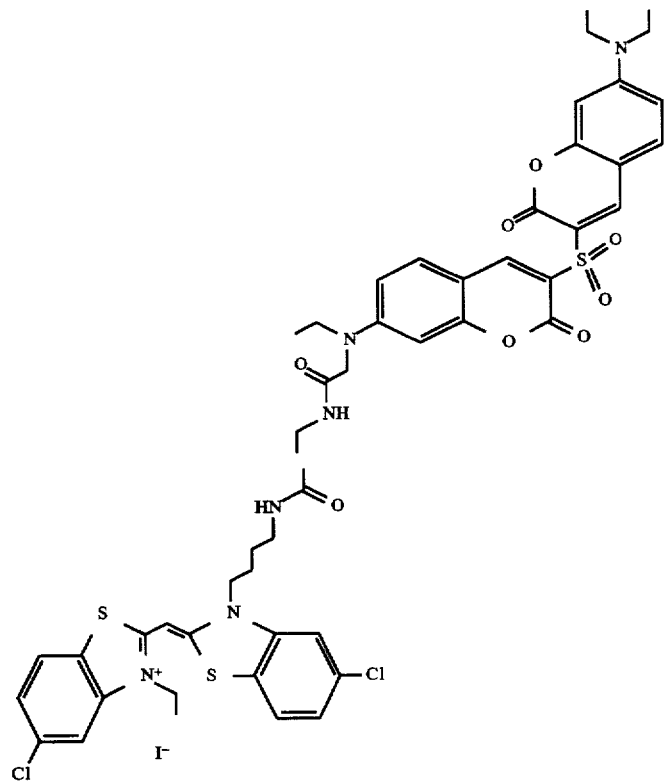

-continued
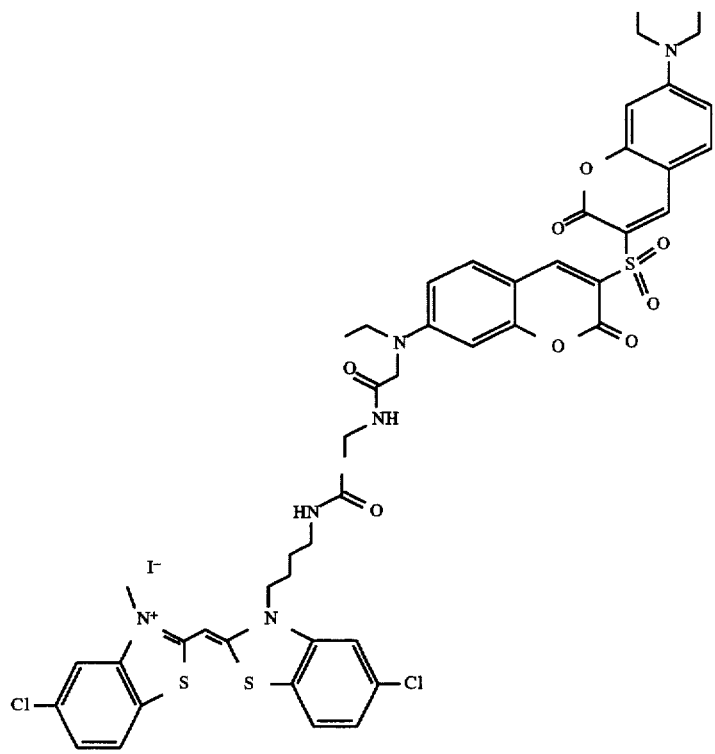
(42)
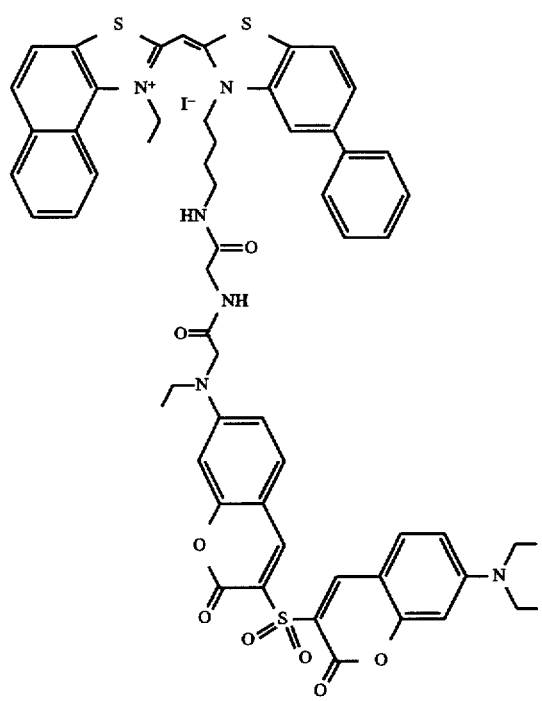
(43)

-continued
(44)
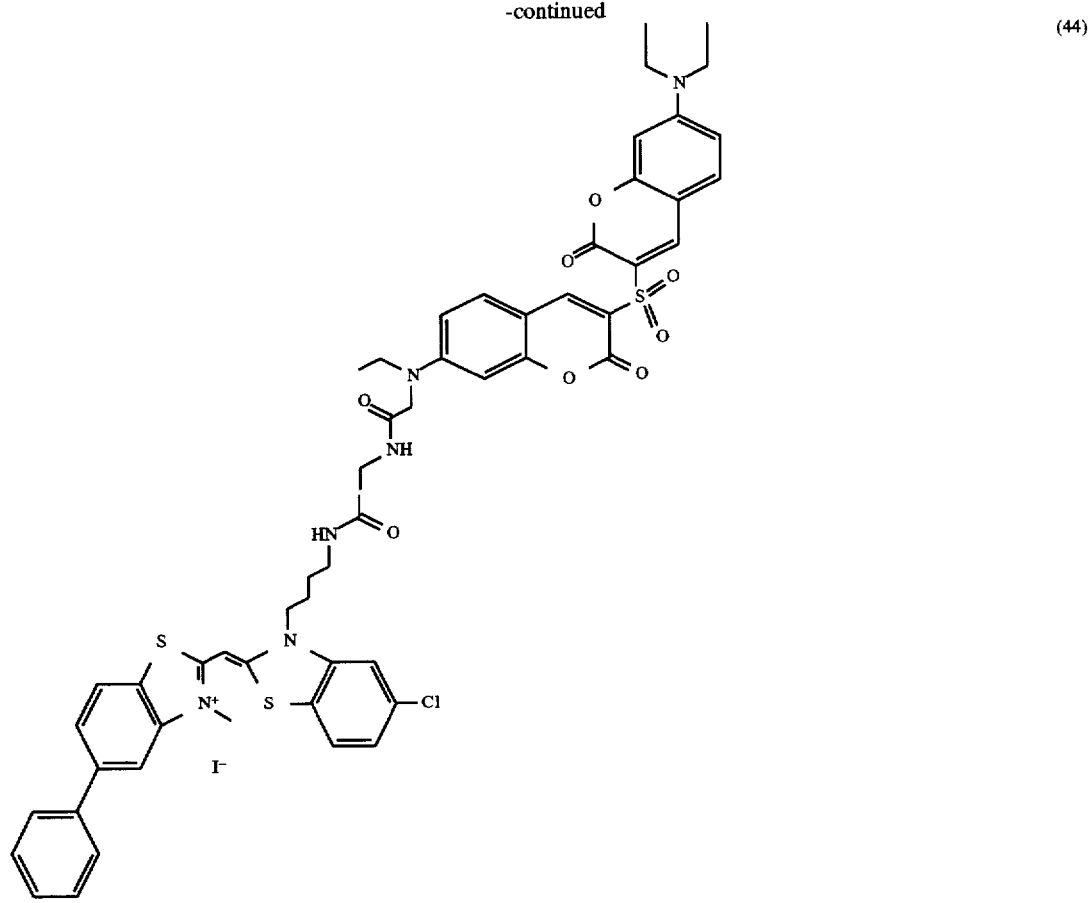
General Synthetic Schemes
The following synthetic schemes describe the preparation of intermediates needed for binary dyes made by the process of the invention.
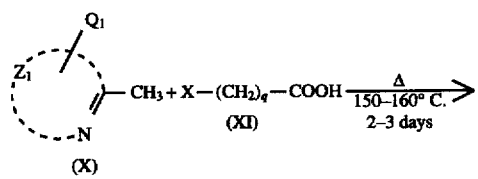
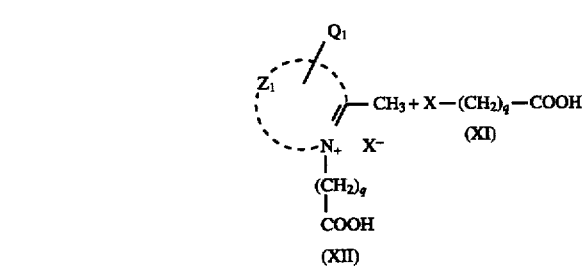
Where q is 1,2,3,4,5 and X is a leaving group such as Cl, Br, or I.
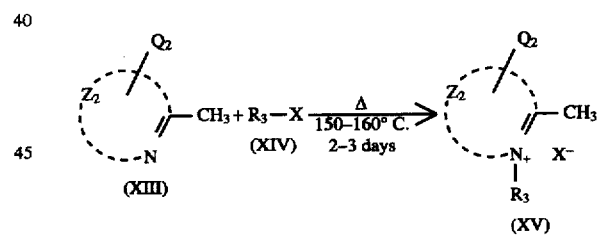
Where $R_3$ has the meaning previously described, X is a leaving group, and $R_3$—X together may be a sultone.
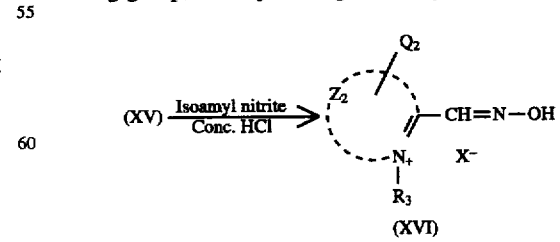

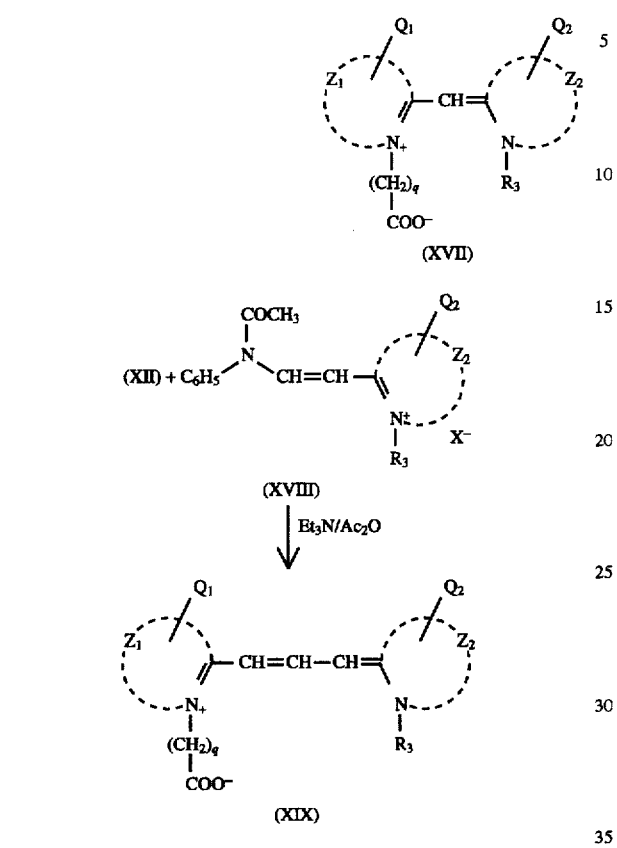

The use of trifluoroacetic acid to effect hydrolysis of phthalimides (XXII) to the corresponding amines (XXIII) was an unexpected and useful discovery. A previously described procedure (U.S. Pat. No. 4,040,825) for the hydrolysis of phthalimides failed to hydrolyze compounds (XXII). Phthalimides attached to carbocyanines can be easily converted to the corresponding amines with hydrazine hydrate. However, this basic reagent could not be applied to cyanine analogs because the primary amino group liberated from its phthalimtide led to intramolecularly cyclized product (XXIV).

The merocyanine structures of tile general formula (I) were prepared by the synthetic scheme outlined below:

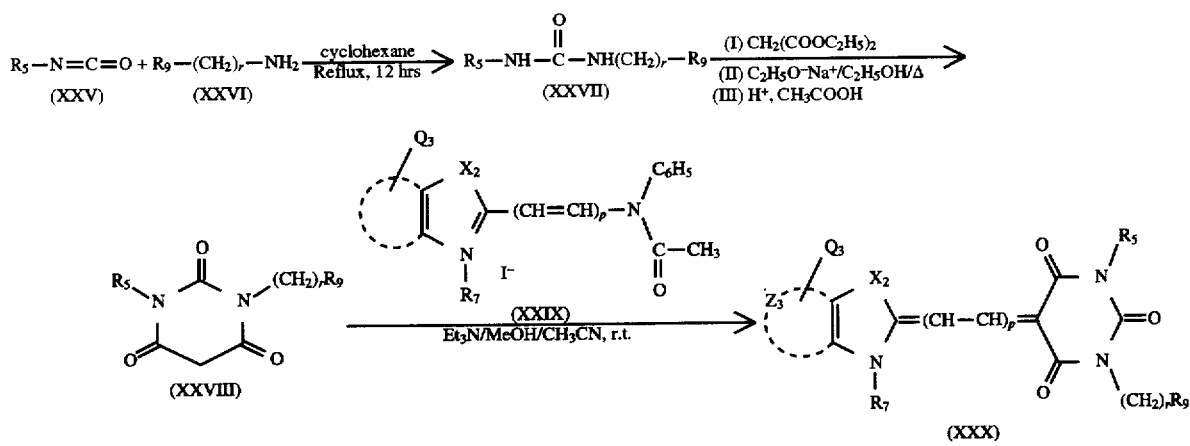

When $R_9$ in XXVI is a hydroxy group or a carboxy group, the $(CH_2)_rR_9$ group becomes part of linkage L in general formula (I).

The biscoumarin intermediates used as the non-adsorbing chromophores of the binary dyes of general formula (II) were prepared by the synthetic schemes outlined below:

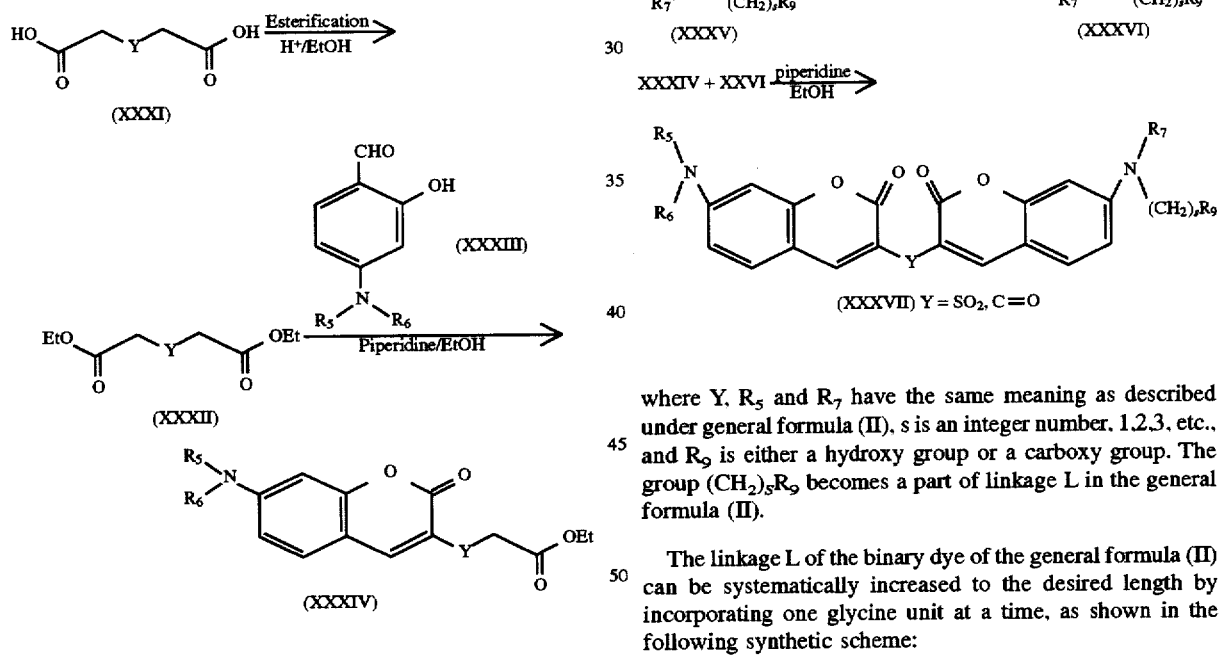

where Y, $R_5$ and $R_7$ have the same meaning as described under general formula (II), s is an integer number, 1,2,3, etc., and $R_9$ is either a hydroxy group or a carboxy group. The group $(CH_2)_sR_9$ becomes a part of linkage L in the general formula (II).

The linkage L of the binary dye of the general formula (II) can be systematically increased to the desired length by incorporating one glycine unit at a time, as shown in the following synthetic scheme:

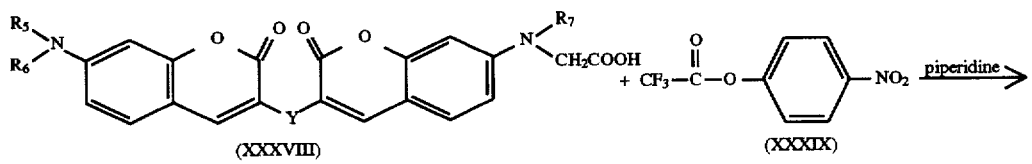

-continued

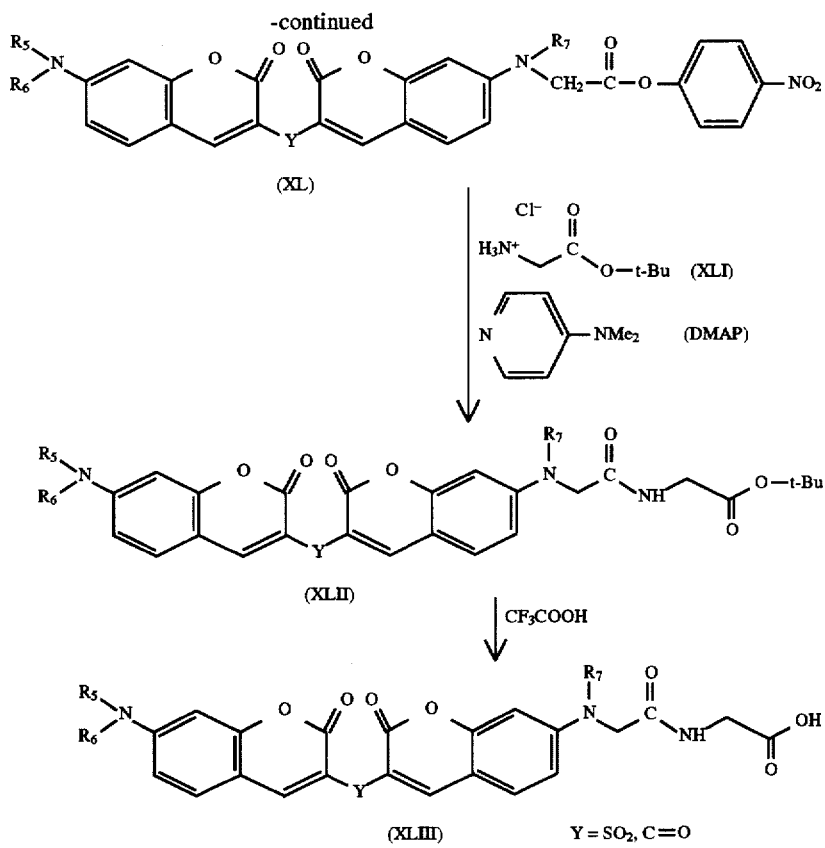

Incorporation of a carbamate group to increase the length of linkage L of the general formula (II) can be accomplished by the following synthetic scheme:

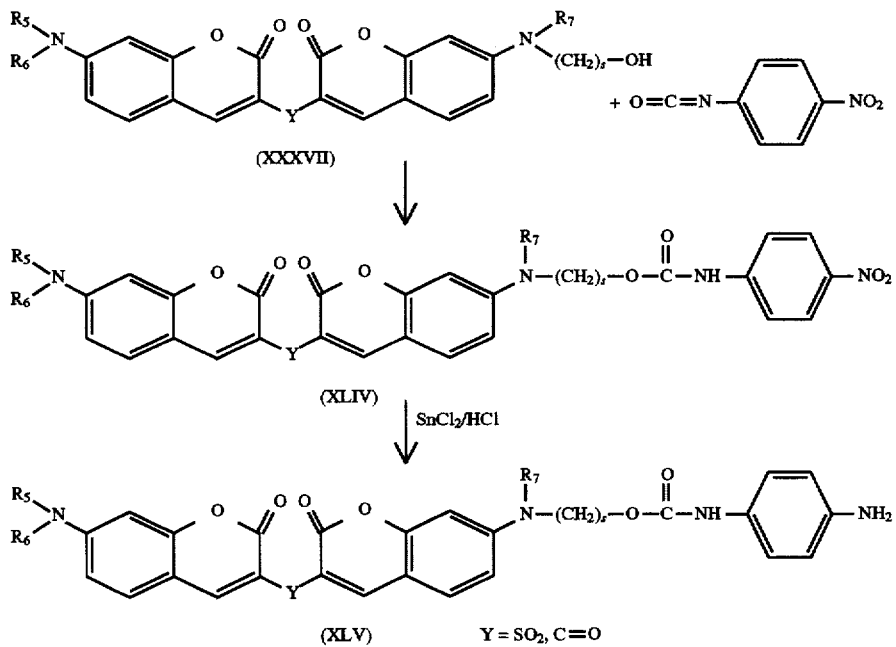

The linking group L which connects the adsorbing chromophore with the non-adsorbing chromophore by a covalent bond can be alkylene, arylene, ether, thioether, ester, amide, thioamide, sulfonamide, urethane, ureido, ketone, and/or thioketone structures as well as composite groups of two or more of the aforementioned structures.

The following examples further illustrate the invention:

EXPERIMENTAL DETAILS

Infrared spectra were recorded on a 1600 FT-IR Perkin-Elmer instrument. Proton NMR spectra were recorded on a General Electric QE-300 MHz instrument. UV-visible absorption spectra were recorded on a λ9 Perkin-Elmer UV-VIS NIR spectrophotometer, and fluorescence spectra were measured on a MPF-66 Perkin-Elmer instrument. Electrophoresis experiments were performed on a paper support using a pyridine, water, 1% acetic acid solution at 1500 volts. The HPLC analyses were run on a Hewlett-Packard 1090 Liquid Chromatograph using a reverse phase column.

EXAMPLE 1

Preparation of a Quaternary Salt Intermediate of General Formula (XII)

A mixture of N-(4-bromobutyl)phthalimide (5.64 g, 0.02 mole) and 5-chloro-2-methylbenzothiazole (3.86 g, 0.002 mole) was taken in a sealed tube and heated in an oil bath at 150°–160° C. under magnetic stirring for 20 hr. The reaction tube was cooled to room temperature and opened. The dark brown, thick residue was triturated with ethyl acetate. The light brown solid material was collected on a sintered glass funnel, washed thoroughly with ethyl acetate, and air-dried. Yield was 4.7 g (50.5%). Other quaternary salts were prepared the same way.

EXAMPLE 2

A General Preparation of Cyanine Dyes of General Formula (XVII)

A quaternary salt of general formula (XII) (0.01 mole) and an oxime of general formula (XVI) (0.01 mole) were mechanically stirred in acetonitrile (400 mL) at room temperature. Distilled water (140 mL) was added slowly to make the reaction mixture a homogeneous solution. Acetic anhydride (3.0 mL) was added and the mixture was stirred for 5 min. Then triethylamine (8.0 mL) was added, and the reaction mixture changed to a light brown homogenous solution. The cyanine dye started to precipitate after 15–20 min. The reaction mixture was stirred for another 2.5 hr. The gelatinous dark yellow precipitate of the dye was collected on a sintered glass funnel, thoroughly washed with acetone, air-dried, and purified by flash column chromatography. Other functionalized cyanines were prepared analogously. Carbocyanine dyes of general formula (XIX) we re prepared using an ICI intermediate of general formula (XVIII).

EXAMPLE 3

Preparation of Primary Aminoalkylsubstituted Cyanine Dyes of General Formula (XXIII)

A phthalimidocyanine dye of general formula (XXII) (0.00186 mole), 31% HBr/acetic acid (50 mL), and 49% (HBr/H20 (20 mL) were placed together with a magnetic stirring bar in the reaction tube. Trifluoroacetic acid (TFA), (15 mL) was slowly added with a pipette while the contents in the flask were scratched with a glass rod. When TFA was added the reaction mixture became orange in color. The reaction mixture was heated in an oil bath at 140° C. fixed on a magnetic stirrer. The mixture was maintained at that temperature for 48–60 hr., then allowed to cool to 30°–35° C. The magnet bar was removed, and the dark yellow homogeneous mixture was transferred to a 500 mL evaporating flask. The solvent and reagent were completely removed on a rotary evaporator under vacuum and at a temperature of 65°–70° C. The thick yellow residue was diluted with 150 mL of reagent grade acetone and agitated with a glass rod. The resulting solid was collected on a sintered glass funnel, washed successively with acetone (2×100 mL) and ether (2×100 mL), and air-dried for 2–3 hr. Occasionally the product was contaminated with 5–10% of starting cyanine dye, in which case it was purified by column chromatography or recrystallization.

EXAMPLE 4

Preparation of a Merocyanine Dye of General Formula (XXX)

In magnetically stirred acetonitrile (350 mL) at room temperature under argon were suspended 2-(2-acetanilidovinyl)-3-ethylbenzoxazolium iodide (8.68 g, 0.02 mole) and $N^1$-ethyl-$N^3$- hydroxyethylbarbituric acid (4.0 g., 0.02 mole). Anhydrous methanol (50 mL) was added slowly to make the reaction mixture homogeneous. Triethylamine (1.0 mL) was added dropwise. Precipitation of the desired dye as a yellow solid occurred instantly. The reaction mixture was stirred overnight at room temperature. The dye was collected on a sintered glass funnel and washed with acetonitrile (2×100 mL), 100 mL of anhydrous ether, and air dried. The yield was 4.55 g (61%). Other merocyanine dyes were prepared analogously.

EXAMPLE 5

Preparation of Ethyl 3-(7-Diethylamino) coumarinylsulfonyl Acetate, an Example of General Formula (XXXIV)

A solution of 10.78 g (0.0559 mole) of 4-(N,N-diethylamino) salicylaldehyde and 13.30 g (0.0559 mole) of bis(ethoxycarbonylmethyl)sulfone [prepared from bis(carboxymethyl)sulfone by esterification with ethanol in the presence of a catalytic amount of sulfuric acid] in 120 mL of ethanol containing 25 drops of piperidine was stirred for 2 days at ambient temperature. The precipitated yellow solid was collected and purified by flash chromatography using 3/2 hexanes/ethyl acetate through silica gel (32–63 micron) to give 13.7 g (70%) of pure product m.p. 148°–149.5° C.

EXAMPLE 6

Preparation of N-Ethyl-N-(2-hydroxyethyl)-4-formyl-3-hydroxyaniline, an Example of General Formula (XXXVI)

To a solution of 29.8 g (0.1 mole) of 3-acetoxy-N-(2-acetoxyethyl)-N-ethyl-4-formylaniline in 175 mL of methanol was added a solution of 17.5 g of sodium hydroxide in 175 mL of water. The mixture was stirred at room temperature overnight. Most of the methanol in the reaction mixture was evaporated with a rotary evaporator and the residue was diluted to 300 mL with water. The pH was adjusted to 6.5–7.0 by adding conc. HCl (ca. 15–20 mL) slowly. The mixture was then extracted with ether (400 mL×3). The combined ether extracts were dried over $MgSO_4$ and evaporated with a rotary evaporator to give 20.19 g (95%) of the product.

EXAMPLE 7

Preparation of 3-[3'-(7'-Diethylamino) coumarinyl] sulfonyl-7-[N-2-hydroxyethyl-N-ethylatninolcoumarin, an Example of General Formula (XXXVII, Y=$SO_2$)

An equimolar mixture of (XXXVI) and (XXXIV) (0.005 mole each) in 50 mL of ethanol containing 0.5 mL of piperidine was refluxed on a steam bath for 8 h. After standing overnight, the reaction mixture was filtered; the solid collected was recrystallized from ethanol/acetonitrile to give 60–70% of the product.

EXAMPLE 8

Preparation of Carboxymethylsubstituted Sulfonyl Coumarin of General Formula (XXXVIII, Y=SO$_2$)

The necessary intermediates were prepared as follows:
m-(N-Ethoxycarbonylmethyl-N-ethyl)aminophenol A mixture of 25 g (0.18 mol) of m-ethylaminophenol, 36.6 g (1.2 equiv.) of ethyl bromoacetate and 13.7 g (0.14 mol) of calcium carbonate in 350 mL of acetonitrile was refluxed with stirring for 3 days. The reaction mixture was poured into 1 L of water, left standing overnight, and filtered. The filtrate was extracted with three portions of ether. The ether extracts were combined, dried over MgSO$_4$, and concentrated on a rotary evaporator. The brown oily residue was vacuum-distilled through a short-path still to give 26 g (64% yield) of the product, bp 150°–152° C./0.3 mm.
3-Acetoxy-N-ethoxycarbonylmethyl-N-ethylaniline To a solution of 11.18 g (0.0506 mol) of m-(N-ethoxycarbonylinethyl-N-ethyl)aminophenol in 4.80 g (1.2 equiv) of pyridine was added 6.19 g (1.2 equiv) of acetic anhydride. The reaction mixture was stirred at room temperature for one hr., then poured into 200 mL of water. The mixture was extracted twice with ether and the extracts were combined, dried over MgSO$_4$, and evaporated. The residue was vacuum distilled to give 8.92 g (67% yield) of the product, b.p. 168° C./2 mm.
3-Acetoxy-N-ethoxycarbonylmethyl-N-ethyl-4-formylaniline, an Example of General Formula (XXXV)

The Vilsmeier reagent (1.2 equiv) was prepared by adding dropwise 2.25 mL of phosphoryl chloride to 15 mL of DMF cooled in an ice/acetone bath under nitrogen for 30 min. To this solution, a solution of 5.26 g (0.02 mol) of 3-acetoxy-N-ethoxycarbonylinethyl-N- ethylaniline in 10 mL of DMF was added. The reaction mixture was warmed to about 75° C. and stirred for 3 hr., then poured into 300 mL of water containing 25 g of sodium acetate. The resulting mixture was stirred for 2 hr. The precipitated light yellow solid was collected by filtration and washed with water to give, after drying, 5.0 g (85% yield) of the product.
4-(N-Carboxymethyl-N-ethylamino)salicylaldehyde, an Example of General Formula (XXXVI)

A solution of 9 g (0.036 mol) of 3-acetoxy-N-ethoxycarbonylmethyl-N-ethyl-4-formylaniline in 280 mL of 10% sodium hydroxide was stirred at room temperature for 1 hr. The brownish yellow solution was poured into 300 mL of 2N HCl, and a yellowish solid precipitated and was collected by filtration, washed with water, and dried in air to give 7.4 g (93% yield) of the product.
3-(7-Diethylaininocoumarinyl-3'-17'-(N-ethyl-N-carboxymethyl)coumarinyl) sulfone, an Example of General Formula (XXXVIII, Y=SO$_2$)

A mixture of 1.7 g (7.6 mmol) of salicylaldehyde (XXXVI), 2.69 g (7.6 mmol) of (XXXIV) and 1.1 g (12.9 mmol) of piperidine in 170 mL of ethanol was refluxed for 7 hr on a steam bath. The reaction mixture was poured into 100mL of 2N HCl and 300 g of crushed ice, from which 3.45 g of crude product precipitated as a yellow solid on standing overnight. Purification was achieved by Soxhlet extraction with 250 mL of ethyl acetate for 72 hr., from which 1.64 g (41%) of the product crystallized.

EXAMPLE 9 p-Nitrophenyl ester of 3-(3'-(7'-Diethylaino) coumarinyl)-sulfonyl-7-(N-carboxumethyl-N-ethylamino)coumarin, an Example of General Formula (XL. Y=SO$_2$)

To a solution of 5.1 g (0.01 mol) of carboxymethylsulfonylcoumarin derivative (XXXVIII) in 50 mL of reagent grade pyridine was added quickly about 7 mL of p-nitrophenyl trifluoroacetate. The mixture was heated with stirring in an oil bath at about 95° C. for 3 hr., cooled to room temperature, and poured into 700 mL of anhydrous ether. The precipitated yellow solid was collected by filtration, washed with ether, and dried immediately in a vacuum oven in the presence of Drierite® overnight. The yield of product was 6.3 g (97%).

EXAMPLE 10

N-(t-Butyl)glycinate of 3-(3'-(7'-Diethylamino) coumarinyl)sulfonyl-7-(N-carboxymethyl-N-ethylainino)coumarin, an Example of General Formula (XLII. Y=SO$_2$)

To a mixture of 6.3 g (9.7 mmol) of the nitrophenyl ester (XL) and 2.5 g (2.1 mole equiv) of 4-(dimethylamino) pyridine (DMAP), in 200 mL of methylene chloride was added 1.8 g (1.1 equiv) of t-butyl glycinate hydrochloride. The reaction mixture was stirred overnight at room temperature, then concentrated on a rotary evaporator. The residue was sonicated in water and the precipitated solid was collected by filtration, washed with water and dried to give 6.1 g (98%) yield of the product.

EXAMPLE 11

3-(3'-(7'-Diethylamino)coumarinyl)sulfonyl-7-(N-(carboxymethylamino) carbonylmethyl-N-ethylamino)coumarin, an Example of General Formula (XLIII, Y=SO$_2$)

To 6.1 g (9.5 mmol) of the t-butyl glycinate XLII was added 30 mL of trifluoracetic acid at room temperature. The resulting dark brown solution was stirred for 2 hours. The excess TFA was then removed on a rotary evaporator, and the residual dark brown oil was added to about 1 liter of water with rapid stirring. The precipitated yellow solid was collected by filtration, washed with water, and dried to give 5.46 g (98% yield) of the product.

EXAMPLE 12 p-Nitrophenylcarbamate of 3-(3'-(7'-Diethylamino) coumarinyl) sulfonyl-7-[N-(2-hydroxyethyl)-N-ethylamino)coumarin, an Example of General Formula (XLIV. Y=SO$_2$)

A mixture of 4.28 g (8.4 mmol) of 2-hydroxyethyl substituted coumarin derivative XXXVII) and 1.33 g (1 mole equiv) of p-nitrophenyl isocyanate in 100 mL of dry acetonitrile (freshly distilled from CaH$_2$) was refluxed for 36 hrs. After cooling, the precipitated yellow solid was collected by filtration and washed with acetonitrile to give 5.25 g (93% yield) of the product.

EXAMPLE 13 p-Aminophenylcarbamate of 3-(3'-(Diethylamino) coumarinyl)-sulfonyl-7-(N-(2-hydroxyethyl)-N-ethylamino)coumarin, an Example of General Formula (XLV. Y=SO$_2$)

A mixture of 5.2 g (7.7 mmol) of the nitrophenyl carbamate XLIV and 15 g (66 mmol) of stannous chloride hydrate in 250 mL of conc HCl was sonicated for 5–½hours at 50°–60° C. The resulting light brown solution was cooled to room temperature and poured into a beaker containing 1.2 liter of water and 200 mL of brine with rapid stirring. The precipitated yellow fluorescent solid was collected and washed carefully first with dilute sodium bicarbonate and then with a small amount of water until the filtrate was neutral. (The product is slightly soluble in water.) The solid was collected and dried to give 4.4 g (88% yield) of the product.

EXAMPLE 14

A General Procedure for the Preparation of Binary Dyes

A mixture of the hydrobromide salt of the alkylamino-substituted cyanine (1 mole equiv.) and N-carboxyalkylsubstituted merocyanine or coumarin derivative (1 mole equiv), 4-(dimethylamino)pyridine (0.3 mole equiv), 3,4-dihydro-2H-pyrido[1,2a]pyrimidin-2- one (1 mole equiv), and reagent grade dimethylsulfoxide (100 mL) was placed in a one-liter 3-necked flask and mechanically stirred at room temperature under argon. When the reaction mixture became nearly homogeneous or a fine suspension (after 15–20 min), 2-chloro-1-methyl-pyridinium iodide (2 mole equiv) was added in a single portion. The reaction mixture was stirred for 15–20 min before the addition of tributylamine (2 mole equiv). Stirring was continued for 2–3 hours. The reaction mixture was poured into one liter of acetone, with stirring. The solid product was collected by filtration, washed successively with acetone (2×100 mL), water (200 mL), acetone (200 mL) and ether (3×100 mL), and air-dried. The crude dye was obtained in a 75–90% yield. The purity of the crude material in most cases was over 80% by HPLC. The binary dyes were purified by flash column chromatography on 230–400 mesh size silica gel. About 2 g of the crude dye was dissolved or suspended in $CH_2Cl_2$/MeOH (500 mL/10mL). Silica gel (20 g, 70–290 mesh size) was added to the solution. Solvent from this mixture was completely removed on a rotary evaporator under vacuum with the water bath temperature maintained at 60°–80° C. The dark yellow residue was diluted with anhydrous ether (400 mL) and scratched with a spatula. The resulting solid was quickly collected on a sintered glass funnel, washed with anhydrous ether (2×100 mL) and air dried. The treatment with ether was necessary to remove any residual methanol from the silica gel coated dye.

The flash chromatographic column was prepared as follows: The bottom-neck of a clean dry glass column was plugged with a small amount of cotton, and sand was added to make 0.25" thick layer over the cotton plug. The column was then packed with the fine grade (230–400 mesh) silica gel to a depth of one foot on top of the sand layer. Now the dye-silica gel mixture prepared as described above was loaded on the top and covered with a 1" layer of coarse grade (70–290 mesh) silica gel. This was further covered with a 0.5" thick plug of glass-wool. The column was now eluted with $CH_2Cl_2$ (500 mL) under 25–30 psig pressure of nitrogen gas. The first eluent was discarded. Subsequent elutions were carried out with $CH_2Cl_2$/MeOH solvent system with increasing polarity under 7–10 psig pressure of nitrogen gas. The following fractions were collected: 20 mL, 20 mL, 60 mL, 70 mL, 500 mL, 500 mL and 500 mL. TLC ($CH_2Cl_2$/MeOH; 8.5/1.5) of each fraction was carried out on a silica gel glass plate. Only those fractions which showed one spot on the TLC plate were combined. The solvent from the combined fractions were removed on a rotary evaporator. The residual yellow solid was triturated with $CH_2Cl_2$ (15 mL), diluted with anhydrous ether (300 mL), and triturated again. The washed solid was collected on a sintered glass funnel, washed with ether (2×50 mL), and air dried. Electrophoresis experiments were performed to determine the ionic nature of the binary dyes.

Binary dyes containing the ester linkages between the two chromophores were prepared analogously, combining carboxyalkylsubstituted cyanines with hydroxyalkylsubstituted merocyanines or hydroxyalkylsubstituted coumarin derivatives.

Preparation of Specific Binary Dyes

The binary dye (VI) was synthesized as an example of an ester type linkage between a quinolinocyanine (IV) and a rhodanine (V) chromopliore by the following procedure:

EXAMPLE 15

Dye (VI) was made from readily available starting dyes (IV) and (V) to establish the general reaction condition for other binary dye examples reported in this invention.

The cyanine dye (IV) (0.01 mole) was dissolved in 1200 mL of dry dichloromethane. The rhodanine dye (V) (2.82 g, 0.01 mole) was dissolved separately in 150 mL of 1-methyl-2-pyrrolidinone and then mixed with the cyanine solution. Tributylamine (4.45 g, 0.024 mole) and 4-(dimethylamino) pyridine (DMAP) (0.27 g, 0.0022 mole) were added. The resulting solution was rapidly added through a dropping funnel to the magnetically stirred suspension of 2-chloro-1-methyl-pyridinium iodide (3.83 g, 0.015 mole) in 300 mL of dry dichloromethane under an argon atmosphere. About 20 min later the precipitated material, which was not identified, was removed by filtration. The filtrate was transferred back to the clean reaction flask and magnetically stirred again for 1.5 hr at room temperature, followed by brief warming for 0.5 hr with a heating mantle. Then the reaction mixture was cooled down to room temperature. The precipitated product was collected on a sintered glass funnel and washed first with dichloromethane (200 mL) and then with anhydrous ether (100 mL). The orange-colored solid was air dried; the yield was 4.4 g (58%). Paper electrophoresis (also called an ionogram) showed it to be a cationic dye. Infrared, $^1H$ NMR, and field desorption mass spectrophotometric measurements were consistent with the proposed structure. The dye had a $\lambda_{max}$ of 461 nm (MeOH) with an $\epsilon_{max}$ of $12.52 \times 10^4$. Elemental analysis: Calcd for $C_{33}H_{31}N_4O_3S_3I \cdot H_2O$: C, 51.25; H, 4.27; N, 7.24; S, 12.42. Found: C, 51.30; H, 4.30; N, 7.4; S, 12.70.

The binary dye (2) was synthesized as an example of the general formula (I) containing an ester type linkage between a cyanine dye of the general formula (XVII) and a inerocyanine dye of the general formula (XXX) by the following procedure:

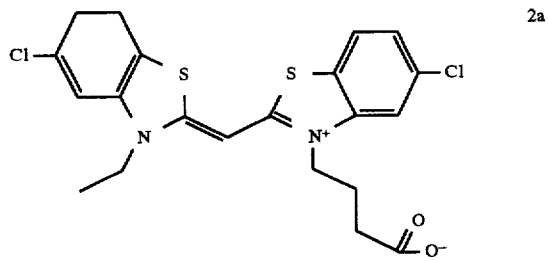

2a

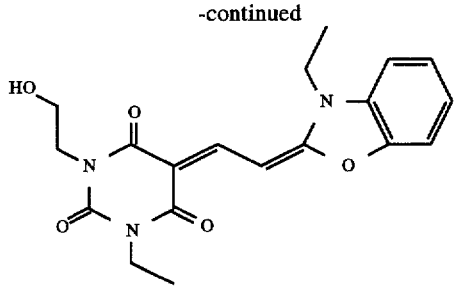

EXAMPLE 16

The N-carboxypropylsubstituted cyanine dye 2a (0.6080 g, 0.00131 mole) and merocyanine dye 2b (0.371 g, 0.001 mole) were sonicated in 700 mL of dry dichloromethane at room temperature under argon for 2.5 hr to produce a very fine suspension. Tributylamine (1.143 g, 1.47 mL, 0.0062 mole) and 4-(dimethylamino)pyridine (DMAP) (0.0366 g, 0.0003 mole) were added successively to the reaction mixture and sonicated for another 2 min. Then 2-chloro-1-methylpyridinium iodide (0.7921 g, 0.0031 mole) was added to the reaction mixture all at once and the resulting reaction mixture was sonicated for an additional 5 hr at room temperature. As the reaction progressed, the mixture turned from deep yellow to deep orange and finally became nearly homogeneous. The solvent was removed completely on a rotary evaporator with the water bath temperature kept below 40° C. The orange-colored thick residue was triturated with anhydrous ether (100 mL) and a few drops of dichloromethane. The insoluble crude product was collected on a sintered glass funnel, washed with anhydrous ether (2×25 mL) and air dried. The yield was 1.80 g, 0.855g in excess of the theoretical yield because of the presence of unreacted 2-chloro-1-methylpyridinium iodide and tributylammonium hydrochloride. These materials were removed by sonicating the crude solid material in 50 mL of distilled water for 5 min and collecting the insoluble binary dye, which now weighed 0.9586 g (ca 100% yield) after drying in a vacuum oven at 40° C. Two more batches were prepared under the same reaction conditions. Crude products from each batch, after water treatment, were combined for further purification by flash column chromatography. The first purification on flash grade silica gel was done by eluting with tetrahydrofuran. About 3.0 g of crude material gave 1.2 g of cleaner product. Its TLC indicated a small amount of starting merocyanine. The whole amount was coated on 10 g of regular column grade silica gel in 100 mL of dichloromethane. The dry coat, which was obtained after removing the solvent, was loaded on 60 g of flash column grade silica gel. It was eluted with a 98:2 mixture of dichloromethane and 2-propanol with the application of 5–10 lbs pressure of nitrogen gas. The first fraction (purple) and second fraction (light brownish yellow) were discarded. The third fraction, which was obtained from a brownish red band portion on the column, was evaporated on a rotary evaporator while the water bath temperature was kept below 40° C. The residue was triturated with anhydrous ether (200 mL), then collected by filtration, washed with anhydrous ether and air dried. The yield was 0.375 g. An ionogram showed it to be a cationic dye. Infrared, 1HNMR, and field desorption mass spectrophotollietric measurements were consistent with the proposed structure. The dye had a $\lambda$max of 414 nm (MeOH) with $\varepsilon$max of 12.97×10$^4$ (dihydrate). Elemental analysis: Calcd for $C_{40}H_{38}Cl_2N_5O_6S_2I \cdot 2H_2O$: C, 48.84; H, 4.2; N, 7.10; S, 6.50. Found: C, 48.70; H, 3.9; N, 6.80; S, 6.60.

When this experiment was repeated in DMSO solvent, no sonication was required and purer product in better yield was obtained.

The binary dye (10) was synthesized as an example of the general formula (1) containing an amide type linkage between a cyanine dye of the general formula (XXIII) and a merocyanine dye of the general formula (XXX) by the following procedure:

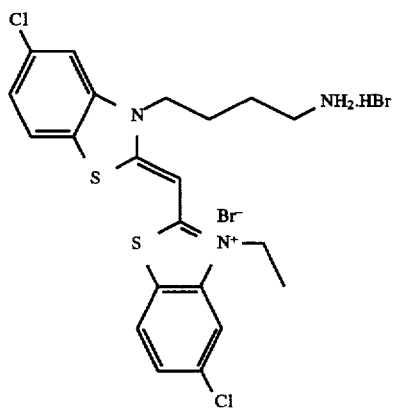

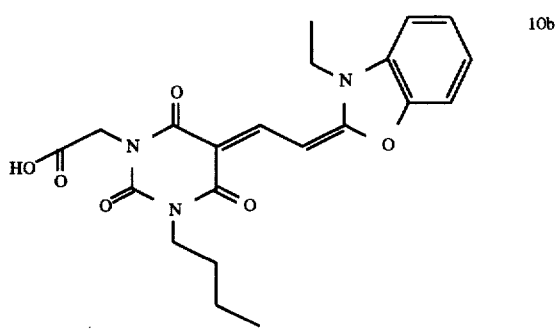

EXAMPLE 17

A mixture of the hydrobromide salt of the N-aminobutylsubstituted cyanine dye 10a (2.22 g, 0.00363 mole) and N-carboxymetliylsubstituted merocyanine dye 10b (1.5 g, 0.00363 mole), 4-(dimethylamino)pyridine (DMAP) (0.133 g, 0.0011 mole), 3,4-dihydro-2H-pyrido[1,2a]pyrimidin-2-one (0.54 g, 0.00363 mole), and reagent grade dimethylsulfoxide (100 mL) was placed in a one-liter 3-necked round-bottomed flask and mechanically stirred at room temperature under argon. When the reaction mixture became nearly homogeneous or a fine suspension (after 15–20 min), 2-chloro-1-methylpyridinium iodide (4.64 g, 0.0182 mole) was added all at once. The reaction mixture was stirred for 15–20 min before the addition of tributylamine (1.343 g, 1.73 mL, 0.0073 mole). Stirring was continued for 2–3 hr. The reaction mixture was poured into one liter of acetone while it was stirred with a glass rod. The solid product was collected by filtration, washed successively with acetone (2×100 mL), water (100 mL), acetone (200 mL) and ether (3×100 mL), and air dried. The crude dye was obtained in 96% yield. The purity of crude material was above 80% as measured by HPLC peak area percent. Its HPLC retention time was 22.9 min. The crude dye was purified by flash column chromatography on 230–400 mesh size silica gel. The purified dye was dissolved or suspended in $CH_2Cl_2$/MeOH (500 mL/10 mL), and silica gel (20 g, 70–290 mesh size) was added. Solvent from this mixture was completely removed on a rotary evaporator under vacuum with the water bath temperature maintained at 60°–80° C. The dark yellow residue in the flask was diluted with anhydrous ether (400 mL) and was scratched with a spatula to induce crystallization. The mixture was quickly filtered through a sintered glass funnel, and the material on the funnel was washed with anhydrous ether (2×100 mL) and air dried. The treatment with ether was necessary to remove any residual methanol from the silica gel coated dye. The remaining procedure of the flash column chromatography and the work-up was performed as in the above described general procedure. 1.578g (43%) of the pure dye was obtained. Infrared, $^1$HNMR, and field desorption mass spectrophotometric measurements were consistent with the proposed structure. The dye had a λmax of 432 nm (MeOH) with an εmax of 14.19×10$^4$. Elemental analysis: Calcd for $C_{42}H_{43}Cl_2lN_6O_5S_2 \cdot 2H_2O$: C, 49.96; H, 4.69; N, 8.32; S, 6.35. Found: C, 50.57: H, 4.33; N, 8.40; S, 7.80.

The binary dye (14) was synthesized as an example of the general formula (I) containing an amide type linkage between a cyanine dye of the general formula (XXIII) and a merocyanine dye of the general formula (XXX) with a different point of attachment in the merocyanine chromophore by the following procedure:

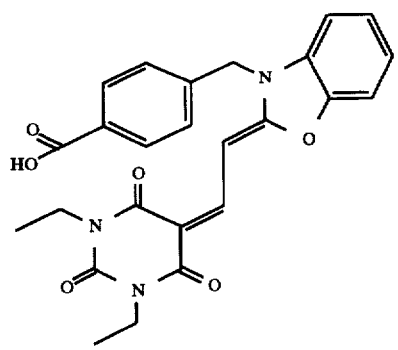

14a

EXAMPLE 18

A mixture of the hydrobromide salt of the N-aminobutylsubstituted cyanine dye 10a (1.30 g, 0.00203 mole) and N-p-carboxyphenylsubstituted merocyanine dye 14a (0.94 g, 0.00203 mole), 4-(dimethylamino)pyridine (DMAP) (0.0743 g, 0.00061 mole), 3,4-dihydro-2H-pyrido [1,2a]pyrimidin-2-one (0.300 g, 0.00203 mole), and reagent grade dimethylsulfoxide (100 mL) was placed in a one-liter 3-necked round bottomed flask and mechanically stirred at room temperature under argon. When the reaction mixture became nearly homogeneous or a fine suspension (after 15–20 min), 2-chloro-1-methylpyridinium iodide (1.037 g, 0.0041 mole) was added all at once. The reaction mixture was stirred for 15–20 min before the addition of tributylamine (0.74 g, 0.95 mL, 0.004 mole), Stirring was continued for 2–3 hours. The reaction mixture was poured into one liter of acetone while it was stirred with a glass rod. The solid product was collected by filtration, washed successively with acetone (2×100 mL), water (100 mL), acetone (200 mL) and ether (3×100 mL), and air dried. The crude yield of the dye was 1.4 g (65%); its purity was over 80% by HPLC peak area percent. Its HPLC retention time was 22.57 min. The crude dye was purified by flash column chromatography on 230–400 mesh size silica gel. The purified dye was dissolved or suspended in CH$_2$Cl$_2$/MeOH (500 mL/10 mL), and silica gel (20 g, 70–290 mesh size) was added to the solution. Solvent from this mixture was completely removed on a rotary evaporator under vacuum with the water bath temperature maintained at 60°–80° C. The dark yellow residue was diluted with anhydrous ether (400 mL) and scratched with a spatula to induce crystallization. The solid was quickly collected on a sintered glass funnel, washed with anhydrous ether (2×100 mL) and air dried. The treatment with ether was necessary to remove any residual methanol from the silica gel coated dye. The remaining procedure of the flash column chromatography and the work-up was performed as in the above described general procedure. The pure dye was obtained in 38% yield (0.82 g). Infrared, $^1$HNMR, and field desorption mass spectrophotometric measurements were consistent with the proposed structure. The dye had a λmax of 432 nm (10% m-cresol/90% MeOH) with an εmax of 15.68×10$^4$. Elemental analysis: Calcd for $C_{46}H_{43}Cl_2lN_6O_5S_2 \cdot 2H_2O$: C, 52.18; H, 4.44; N, 7.94; S, 6.05. Found: C, 52.79; H, 4.48; N, 7.95; S, 5.99.

The binary dye (24) was synthesized as an example of the General Formula (II) containing an ester type linkage between a cyanine dye of the general formula (XVII) and a sulfonylcoumarin dye of the general formula (XXXVII, Y=SO$_2$) by the following procedure:

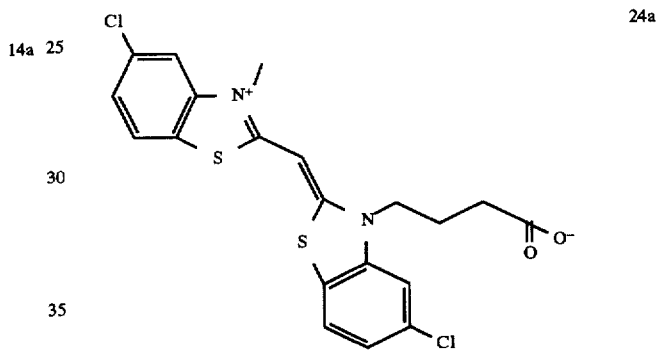

24a

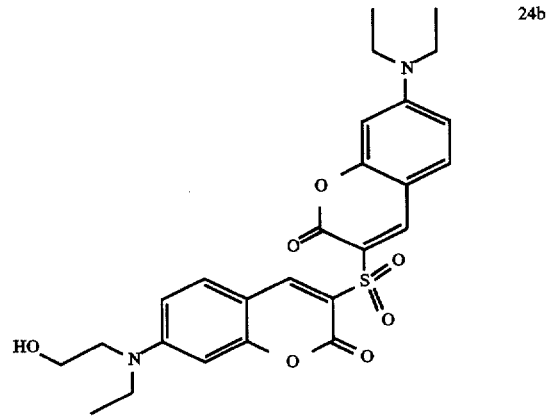

24b

EXAMPLE 19

The N-carboxypropylsubstituted cyanine dye 24a (0.2553 g, 0.0005 mole) and N-hydroxyethylsubstituted bis(3-sulfonyl)coumarin dye 24b (0.2588 g, 0.0005 mole) were sonicated in 500 mL of dry dichloromethane at room temperature under argon for 2.5 hr to produce a very fine suspension. Tributylamine (0.11 g, 0.14 mL, 0.0006 mole) and 4-(dimethylamino)pyridine (DMAP) (0.0183 g, 0.00015 mole) were added successively to the reaction mixture, which was sonicated for another 2 min. Then 2-chloro-1-methylpyridinium iodide (0.1789 g, 0.0007 mole) was added, and the resulting mixture was sonicated for an additional 1.5 hr at room temperature. As the reaction progressed, the mixture turned from deep yellow to deep orange and finally became nearly homogeneous. The solvent was removed completely on a rotary evaporator with the water bath temperature kept below 40° C. The orange-colored thick residue was triturated with anhydrous ether (100 mL) and a few drops of dichloromethane. The insoluble crude product was collected on a sintered glass funnel, washed with anhydrous ether (2×25 mL) and air dried. The yield was 0.443 g. The crude dye was further purified by flash column chromatography as in the above described general procedure. The purified yield was 0.115 g. An ionogram showed it to be a cationic dye. Infrared, $^1$HNMR, and field desorption mass spectrophotometric measurements were consistent with the proposed structure. The dye had a λmax of 430 nm (MeOH) with an εmax of 13.82×104 (dihydrate). Elemental analysis: Calcd for $C_{46}H_{43}Cl_2N_4O_8S_3I \cdot 2H_2O$: C, 49.78; H, 4.27; N, 505. Found: C, 50.47; H, 3.88; N, 5.04.

When this reaction was repeated in dimethylsulfoxide solvent, no sonication was required and a cleaner product was formed in a better yield.

The binary dye (28) was synthesized as an example of the general formula (II) containing an ester type linkage between a cyanine dye of the general formula (XVII) and a ketocoumarin dye of the general formula (XXXVII, Y=CO) by the following procedure:

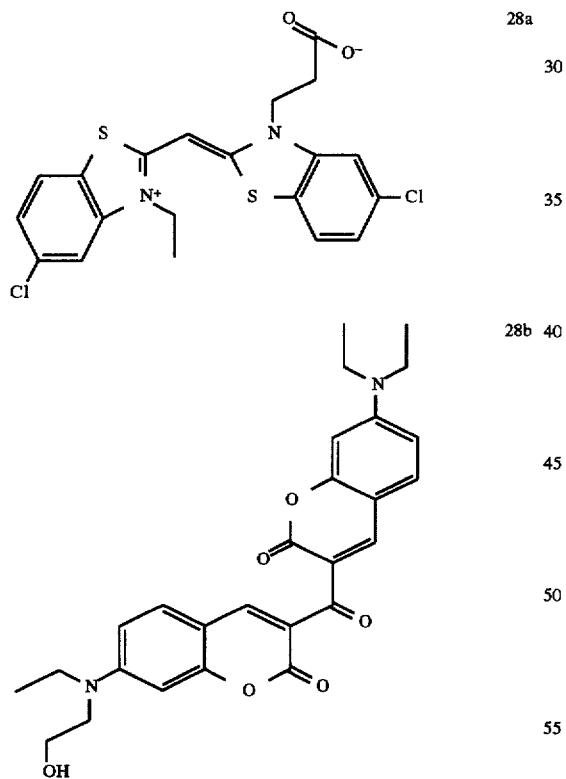

EXAMPLE 20

The N-carboxybutylsubstituted cyanine dye 28a (0.5155 g, 0.001 mole) and N-hydroxyethylsubstituted ketocoumarin dye 28b (0.4765 g, 0.001 mole) were sonicated in a water bath in 500 mL of dry dichloromethane at room temperature under argon for 2.5 hr to produce a very fine suspension. Tributylamine (0.222 g, 0.29 mL, 0.0012 mole) and 4-(dimethylamino) pyridine (DMAP) (0.0366 g, 0.0003 mole) were added successively, and the mixture was soni-cated for another 2 min. Then 2-chloro-1-methylpyridinium iodide (0.3577 g, 0.00(15 mole) was added, and the resulting mixture was sonicated for an additional 1.5 hr at room temperature. As the reaction progressed, the mixture turned from deep yellow to deep orange and finally became nearly homogeneous. The solvent was removed completely on a rotary evaporator with the water bath temperature kept below 40° C. The orange-colored thick residue was triturated with anhydrous ether (100 mL) and a few drops of dichloromethane, and the crude product was collected on a sintered glass funnel. It was washed with anhydrous ether (2×25 mL) and air dried. The yield was 0.9256 g. The crude dye was further purified by flash column chromatography as in the above described general procedure. The purified yield was 0.605 g (57%). An ionogram showed it to be a cationic dye. Infrared, $^1$HNMR, and field desorption mass spectrophotometric measurements were consistent with the proposed structure. The dye had a λmax of 430 nm (MeOH) with εmax of 12.51×104 (solvate). Elemental analysis: Calcd for $C_{49}H_{47}Cl_2N_4O_7S_2I \cdot H_2O$: C, 54.25; H, 4.52; N, 5.17. Found: C, 54.38; H, 4.61; N, 5.09.

When this reaction was repeated with dimethylsulfoxide solvent, a cleaner product was obtained in a better yield.

The binary dye (41) was synthesized as an example of the general formula (II) containing an amide type linkage between a cyanine dye of the general formula (XXIII) and a sulfonylcoumarin dye of the general formula (XXXVII, Y=SO$_2$) by the following procedure:

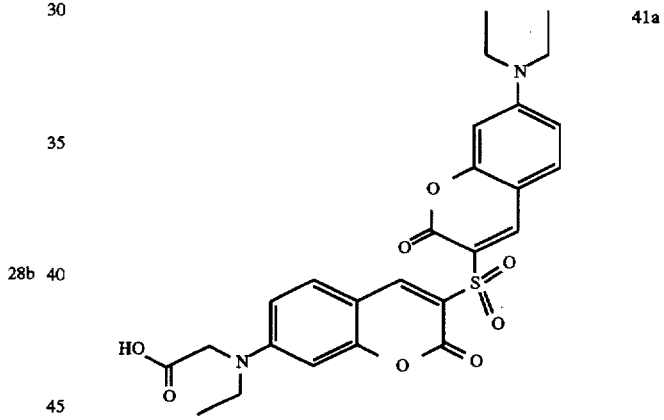

EXAMPLE 21

A mixture of the hydrobromide salt of the N-aminobutylsubstituted cyanine dye 10a (1.225 g, 0.002 mole) and N-carboxymethylsubstituted bis(3-sulfonyl) coumarin dye 41a (1.052 g, 0.002 mole), 4-(dimethylamino) pyridine (DMAP) (0.073 g, 0.0006 mole), 3,4-dihydro-2H-pyrido[1,2a]pyrimidin-2-one (0.296 g, 0.0002 mole), and reagent grade dimethylsulfoxide (100 mL) was placed in a one-liter 2-necked round bottomed flask and mechanically stirred at room temperature under argon. When the reaction mixture became nearly homogenous or a fine suspension (after 15-20 min), 2-chloro-1-methylpyridinium iodide (2.555 g, 0.01 mole) was added. The mixture was stirred for 15-20 min before the addition of tributylamine (0.74 g, 0.95 mL, 0.004 mole). Stirring was continued for 2-3 hours. The reaction mixture was poured into one liter of acetone while being stirred with a glass rod. The solid product was collected by filtration, washed successively with acetone (2×100 mL), water (100 mL), acetone (200 mL) and ether (3×100 mL), and air dried. 1.8 g (80% yield) of the crude dye was obtained. The purity of crude material was over 90% by HPLC peak area percent. Its HPLC retention time was 26.1 min. The purified dye was purified by flash column chromatography on 230–400 mesh size silica gel. The crude dye was dissolved or suspended in CH$_2$Cl$_2$/MeOH (500 mL/10 mL), and silica gel (20 g, 70–290 mesh size) was added. Solvent from this mixture was completely removed on a rotary evaporator under vacuum with the water bath temperature maintained at 60°–80° C. The dark yellow residue was diluted with anhydrous ether (400 mL) and was scratched with a spatula. The resulting solid was quickly collected by filtration on a sintered glass funnel, washed with anhydrous ether (2×100 mL) and air dried. The treatment with ether was necessary to remove any residual methanol from the silica gel coated dye. The remaining procedure of the flash column chromatography and the work-up was performed as in the above described general procedure. 0.99 g (44% yield) of pure dye was obtained. Infrared, $^1$HNMR, and field desorption mass spectrophotometric measurements were consistent with the proposed structure. The dye had a λmax of 430.6 nm (MeOH) with an εmax of 13.40×10$^4$. Elemental analysis: Calcd for C$_{47}$H$_{46}$N$_5$Cl$_2$IO$_7$S$_3$·2H$_2$O: C, 50.27; H, 4.49; N, 6.24; S, 8.57. Found: C, 50.93; H, 4.20; N, 6.30; S, 8.65.

The binary dye (38) was synthesized as an example of the general formula (II) containing a carbamate type linkage between a cyanine dye of the general formula (XVII) and a sulfonylcoumarin dye of the general formula (XXXVII, Y=SO$_2$) by the following procedure:

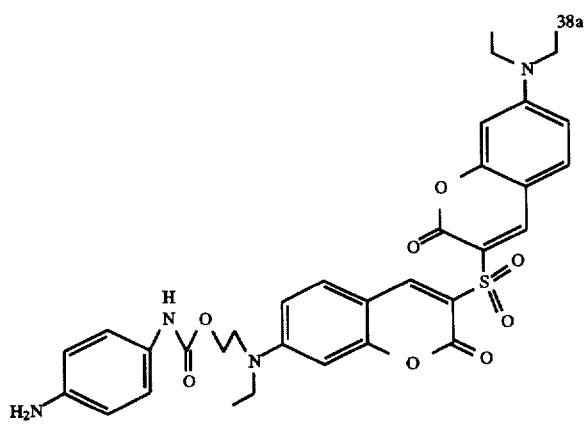

EXAMPLE 22

A mixture of N-carboxypropylsubstituted cyanine dye 24 a (0.505g, 0.001 mole) and p-aminophenylcarbamatesubstituted bis(3-sulfonyl) coumarin dye 38 a (0.65 g, 0.001 mole), 4-(dimethyamino) pyridine (DMAP) (0.040 g, 0.00033 mole), 3,4-dihydro-2H-pyrido [1,2a]pyrimidin-2-one (0.163 g, 0.0011 mole), and a reagent grade dimethylsulfoxide (100 mL) was placed in a one-liter 3-necked round bottomed flask and mechanically stirred at room temperature under argon. When the reaction mixture became nearly homogeneous or a fine suspension (after 15–20 min), 2-chloro-1-methylpyridinium iodide (1.535 g, 0.005 mole) was added. The mixture was stirred for 15–20 min before the addition of tributylamine (0.23 mL, 0.001 mole). Stirring was continued for 2–3 hours. The mixture was poured into one liter of acetone while being stirred with a glass rod. The solid was collected by filtration, washed successively with acetone (2×100 mL), water (100 mL), acetone (200 mL) and ether (3×100 mL), and air dried. 1.8 g (80% yield) of crude dye was obtained. The purity of the crude dye was over 90% by HPLC peak area percent. Its HPLC retention time was 26.1 min. The purified dye was purified by flash column chuomatography on 230–400 mesh size silica gel. The crude dye was dissolved or suspended in CH$_2$Cl$_2$/MeOH (500 mL10 mL), and silica gel (20 g, 70–290 mesh size) was added. Solvent from this mixture was completely removed on a rotary evaporator under vacuum with the water bath temperature maintained at 60°–80° C. The dark yellow residue was diluted with anhydrous ether (400 mL) and was scratched with a spatula. The resulting solid was quickly collected by filtration on a sintered glass funnel, washed with anhydrous ether (2×100 mL) and air dried. The treatment with ether was necessary to remove any residual methanol from the silica gel coated dye. The remaining procedure of the flash column chromatography and the work-up was performed as in the above described general procedure. The pure dye was obtained in 40% (0.83 g) yield. Infrared, 1HNMR, and field desorption mass spectrophotometric measurements were consistent with the proposed structure. The dye had a λmax of 430 nm (MeOH) with an εmax of 13.68×10$^4$. Elemental analysis: Calcd for C$_{53}$H$_{49}$Cl$_2$IN$_6$O$_9$S$_3$·2H$_2$O: C,51.17; H, 4.29; N, 6.76; S, 7.73. Found 50.83; H1, 4.06; N, 6.68; S, 6.91.

The binary dye (42) was synthesized as an example of the general formula (II) containing two glycine units in the linkage between a cyanine dye of the general formula (XXIII) and a sulfonylcoumarin dye of the general formula (XXX-VH, Y=SO$_2$) by the following procedure:

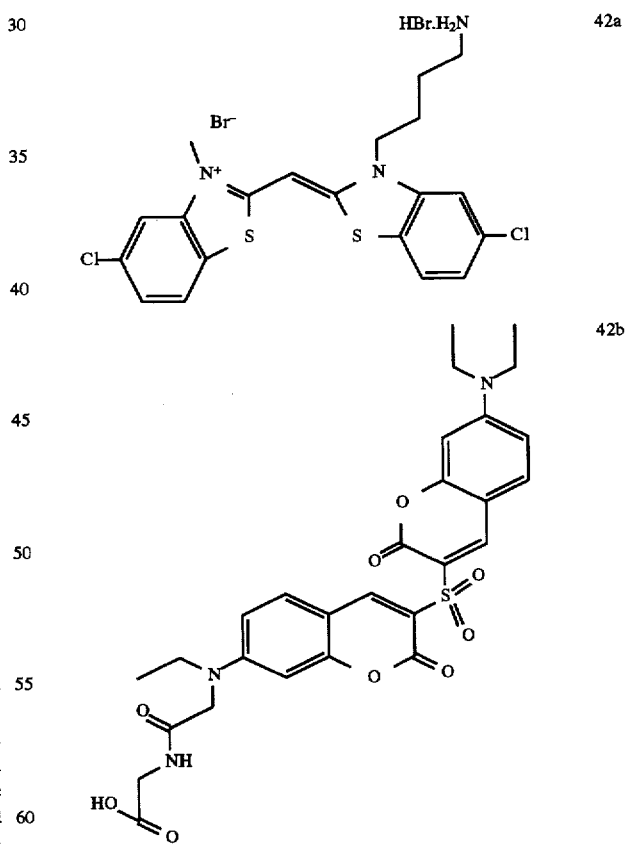

EXAMPLE 23

A mixture of N-aminobutyl substituted cyanine dye 42a (2.465 g, 0.004 mole) and bis(3-sulfonyl) coumarincarboxylic acid dye 42b (2.323 g, 0.004 mole), 4-(dimethylamino)pyridine (DMAP) (0.146 g, 0.0012 mole), 3,4-dihydro-2H-pyrido [1,2a]pyrimidin-2-one (0.60 g, 0.004 mole), and reagent grade dimethylsulfoxide (100 mL) was placed in a one liter 3-necked round bottom flask and mechanically stirred at room temperature under argon. When the reaction mixture became nearly homogeneous or a fine suspension (after 15–20 min.), 2 chloro-1-methylpyridinium iodide (5.00 g, 0.02 mole) was added. The mixture was stirred for 15–20 min. before the addition of tributylamine (1.9 mL, 1.478 g, 0.008 mole). Stirring was continued for 2–3 hours. The mixture was poured into one liter of acetone while being stirred with a glass rod. The precipitated solid was collected by filtration, washed successively with acetone (2×100 mL), water (100 mL), acetone (200 mL) and ether (3×100 mL), and air dried. 4.29 g (92% yield) of crude dye was obtained. Its HPLC retention time was 19.86 min. The purified dye was purified by flash column chromatography on 230–400 mesh size silica gel. The crude dye was dissolved or suspended in $CH_2Cl_2$/MeOH(500 mL/10mL). Silica gel (20 g, 70–290 mesh size) was added, and the solvent from this mixture was completely removed on a rotary evaporator under vacuum with the water bath temperature maintained at 60°–80° C. The dark yellow residue in the flask was diluted with anhydrous ether (400 mL) and scratched with a spatula. The resulting solid was quickly collected by filtration, washed with anhydrous ether (2×100 mL) and air dried. The treatment with ether was necessary to remove any residual methanol from the silica gel coated dye. The remaining procedure of the flash column chromatography and the work-up was preformed as in the above described general procedure. The pure dye was obtained in 23% yield. Infrared, $^1$HNMR, and field desorption mass spectrophotoinetric measurements were consistent with the proposed structure. The dye had a λmax of 430 nm with an εmax of $12.96×10^4$. Elemental analysis: Calcd for $C_{48}H_{47}Cl_2IN_6O_8S_3 \cdot 2H_2O$: C, 49.45; H, 4.41; N, 7.21; S, 8.25. Found: C, 4.17; H, 4.10; N, 7.15; S, 8.31.

The invention has been described in detail with particular reference to preferred embodiments thereof, but it will be understood that variations and modifications can be effected within the spirit and scope of the invention.

We claim:

1. A process for the preparation of binary sensitizing dyes comprising reacting a solution of two dye compounds, one of which contains a carboxyl and the other of which contains an amino or a hydroxyalkyl, in the presence of a 2-halo-1-alkylpyridinium salt and a 4-dialkylaminopyridine so that the two dye compounds undergo a dehydrative condensation reaction.

2. A process according to claim 1 wherein one of said dye compounds can adsorb to a silver halide grain surface and the other of said dye compounds is substantially non-adsorbable to a silver halide grain surface, and the resulting binary sensitizing dye is of general formulas (I), (II), or (III)

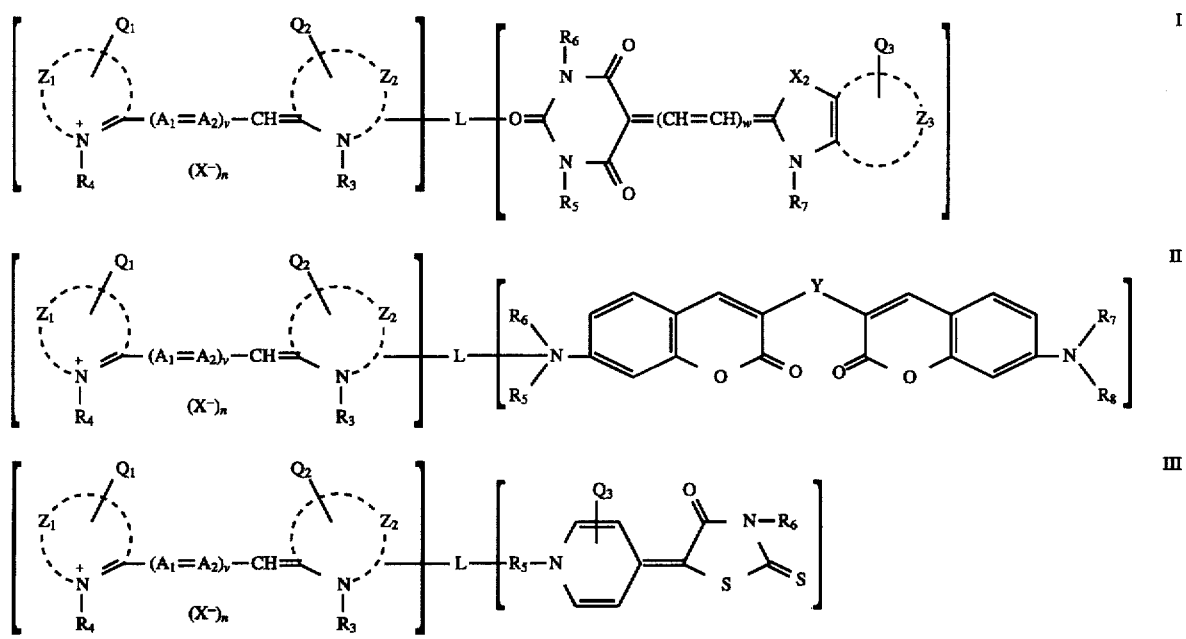

wherein $A_1$ and $A_2$ each individually represent unsubstituted or alkylsubstituted methine; L represents 4 to about 20 atoms and includes at least two alkylenes and at least one carbonyloxy or carbonylamino, and covalently links the two dye compounds so they are nonconjugated; $Z_1$, $Z_2$, and $Z_3$ each represent non-metallic atoms which complete a substituted or unsubstituted 5- or 6- membered heterocyclic ring; $R_3$ and $R_4$ each individually represents an alkyl of 1 to about 10 carbon atoms, or an aryl, aralkyl, or cycloalkyl of 5 to about 12 carbon atoms, or, joined with $R_5$, $R_6$, $R_7$, $R_8$, or $Q_3$, represents L; $R_5$, $R_6$, $R_7$, and $R_8$ each individually represents an alkyl of 1 to about 10 carbon atoms, or an aryl, aralkyl, or cycloalkyl of 5 to about 12 carbon atoms, or, joined with $R_3$, $R_4$, $Q_1$, or $Q_2$, represents L; $Q_1$ and $Q_2$ each individually represents hydrogen, or an alkyl of 1 to about 10 carbon atoms, or an aryl, aralkyl, or cycloalkyl of 5 to about 12 carbon atoms, or, joined with $R_5$, $R_6$, $R_7$, $R_8$, or $Q_3$, represents L; $Q_3$ represents hydrogen, or an alkyl of 1 to about 10 carbon atoms, or an aryl, aralkyl, or cycloalkyl of 5 to about 12 carbon atoms, or, joined with $R_3$, $R_4$, $Q_1$ or $Q_2$, represents L; Y represents a carbonyl, sulfonyl or an amino; $X^-$ represents an anion and n represents an integer of 1 or more, provided that when the formula forms a zwitterionic dye, n is 0; $X_2$ represents a carbon atom or hetero atom N, O, S, Se, or Te; and v and w individually represent integer numbers from 0 to 3.

3. A process according to claim 2 wherein L is $R_4$ joined with $R_5$.

4. A process according to claim 2 wherein L is $R_4$ joined with $R_7$.

5. A process according to claim 2 wherein $A_1$ and $A_2$ are each CH.

6. A process according to claim 1 wherein one of said dye compounds is a merocyanine dye.

7. A process according to claim 1 wherein one of said dye compounds is a carbonlbiscoumarin or a sulfonylbiscoumarin dye.

8. A process according to claim 1 wherein one of said dye compounds is a rhodanine dye.

9. A process according to claim 1 wherein one of said dye compounds is a cyanine, carbocyanine, dicarbocyanine, or tricarbocyanine dye.

10. A process according to claim 1 wherein said 2-halo-1-alkylpyridinium salt is 1-methyl-2-chloropyridinium iodide.

11. A process according to claim 1 wherein said 4-dialkylaminopyridine is 4-(dimethylamino)pyridine.

12. A process according to claim 1 wherein said solvent is a polar aprotic solvent.

13. A process according to claim 12 wherein said polar aprotic solvent is dimethylsulfoxide.

14. A process according to claim 1 wherein the two dye compounds are reacted in the presence of 3,4-dihydro-2H-pyrido[1,2a]pyrimidin-2-one.

* * * * *